US009667495B2

United States Patent
Van Der Merwe et al.

(10) Patent No.: US 9,667,495 B2
(45) Date of Patent: May 30, 2017

(54) PROGRAMMABLE DATA NETWORK MANAGEMENT AND OPERATION

(71) Applicant: Entry Point, LLC, Salt Lake City, UT (US)

(72) Inventors: Jacobus Erasmus Van Der Merwe, Salt Lake City, UT (US); Robert Preston Reikenberg Ricci, Salt Lake City, UT (US); Sneha Kumar Kasera, Salt Lake City, UT (US); Matt Aaron Strum, Seattle, WA (US); Carl Robert Peterson, Idaho Falls, ID (US); Jeffrey Robert Peterson, Ammon, ID (US)

(73) Assignee: ENTRY POINT, LLC, Salt Lake City, UT (US)

( * ) Notice: Subject to any disclaimer, the term of this patent is extended or adjusted under 35 U.S.C. 154(b) by 12 days.

(21) Appl. No.: 14/764,136

(22) PCT Filed: Aug. 19, 2014

(86) PCT No.: PCT/US2014/051634
§ 371 (c)(1),
(2) Date: Jul. 28, 2015

(87) PCT Pub. No.: WO2015/026785
PCT Pub. Date: Feb. 26, 2015

(65) Prior Publication Data
US 2015/0365288 A1  Dec. 17, 2015

Related U.S. Application Data

(60) Provisional application No. 61/867,297, filed on Aug. 19, 2013.

(51) Int. Cl.
*H04W 92/02* (2009.01)
*H04L 12/24* (2006.01)
(Continued)

(52) U.S. Cl.
CPC ........ *H04L 41/0823* (2013.01); *G06Q 10/06* (2013.01); *H04L 41/16* (2013.01);
(Continued)

(58) Field of Classification Search
CPC ..... H04L 12/66; H04L 41/5054; H04L 67/16; H04W 4/00; H04W 4/001; H04W 92/02
See application file for complete search history.

(56) References Cited

U.S. PATENT DOCUMENTS 8,307,070 B2  11/2012  Jeong et al.
2002/0176378 A1*  11/2002  Hamilton ............ H04L 12/2602
370/328

(Continued)

*Primary Examiner* — Raj Jain
(74) *Attorney, Agent, or Firm* — Brian Tucker; Kirton | McConkie

(57) ABSTRACT

Methods, systems, and devices for automatically and dynamically managing and coordinating network resources used by services between users over a data network having a network infrastructure. A network resources coordinator can include a knowledge store, rules library, rules engine, and orchestrator. The knowledge store can have a plurality of layered abstraction stores having stored thereon facts representative of a present state of the network. The rules library can include production rules representative of knowledge of the network and of users. The orchestrator can receive service requests from users and use the rules engine in conjunction with the production rules of the rules library and facts of the knowledge store to: determine network resources required and available for requested services, dynamically make automated decisions with respect to the network and users, detect and react to changes in the network in an automated fashion, and enforce constraints of the network.

20 Claims, 12 Drawing Sheets

(51) Int. Cl.
*G06Q 10/06* (2012.01)
*H04W 4/00* (2009.01)
*H04L 29/08* (2006.01)

(52) U.S. Cl.
CPC ...... *H04L 41/5051* (2013.01); *H04L 41/5054* (2013.01); *H04W 92/02* (2013.01); *H04L 41/0659* (2013.01); *H04L 67/16* (2013.01); *H04W 4/00* (2013.01)

(56) References Cited

U.S. PATENT DOCUMENTS

| | | | |
|---|---|---|---|
| 2007/0043651 A1* | 2/2007 | Xiao | G06Q 30/08 705/37 |
| 2010/0211638 A1* | 8/2010 | Rougier | H04L 67/34 709/205 |
| 2013/0091283 A1 | 4/2013 | Omar | |
| 2013/0132854 A1 | 5/2013 | Raleigh et al. | |
| 2013/0254539 A1* | 9/2013 | Auradkar | G06F 21/6209 713/165 |
| 2013/0305322 A1* | 11/2013 | Raleigh | G06Q 30/016 726/4 |
| 2015/0356104 A9* | 12/2015 | Kagan | H04L 67/06 707/812 |
| 2015/0365288 A1* | 12/2015 | Van Der Merwe | H04L 41/5051 370/254 |

\* cited by examiner

PROGRAMMABLE DATA NETWORK MANAGEMENT AND OPERATION

BACKGROUND OF THE INVENTION

1. The Field of the Invention

The present invention relates to methods, systems, and computer program products for the management of networks. More specifically, the present invention relates to the automated management and coordination of network resources for the use of services over data networks.

2. The Relevant Technology

Managing data networks is challenging. Traditional data networks are complex closed systems. In these networks, the network operator and service providers are traditionally the same organization and services are tightly controlled. Services are provisioned and allocated in response to customer requests for service. The processes for executing these requests require human interaction and tend to be manually labor intensive and time consuming. In addition, network operators have to worry about fault management, changing configurations without affecting current services, adding new features, user setup and removal, etc. This also requires human interaction and is manually labor intensive and time consuming.

Network management concerns are magnified in open access network (OAN) environments. OAN refers to a data network operated by a network operator such that the network operator and the users of the network each have the ability to configure services. OANs are often realized with Fiber-to-the-Home (FTTH) technology where the network architecture is very simple and fast. There are many examples of publicly-owned OANs including Utah's Utopia, Stockholm's Stokab, and Amsterdam's CityNet. Some private organizations have also built out OANs including Reggefiber, Quadracom, and MBC's network.

One benefit of an OAN is that an end user, also known as a subscriber, can typically receive services from a number of different service providers over the OAN. While this is a benefit for the subscriber, it creates a number of difficulties for the network operator; instead of managing services from just a single service provider as in closed networks, the network operator must now manage and coordinate services from a plurality of service providers.

OANs are often part of government broadband initiatives and typically involve home owners buying a physical network connection to the operator network. This low latency, high capacity connection then effectively becomes part of the home's amenities and the home owner separately subscribes to network services from any of the service providers that operate on this infrastructure. Many municipalities and some private companies are moving to provide high-speed network infrastructure to users to promote the use of OAN environments and to encourage innovation by allowing multiple service providers to provide services thereon.

The inherent complexity of roles and responsibilities in OANs, combined with the lack of automated network management in these environments, prevent OANs from being the enabler for innovation they were originally envisioned to be. In short, without automation, OANs degenerate to more complex versions of their "closed network" counterparts—for example, a human is still required in the loop to set up or change services between a subscriber and service provider, to detect and fix problems in the network, etc. In contrast, with the automated network management, control, and operation devices and methods presented herein, open access networks can be enabled to support services and applications that can truly exploit the capabilities of low latency and high capacity access networks.

BRIEF SUMMARY

Embodiments of the present invention relate to the automated management and coordination of data network resources, including for programmable data networks, through programmability and automation.

In one embodiment, a network resources coordinator can be configured to automatically and dynamically manage and coordinate network resources used by services between users over a data network having a network infrastructure operated by a network operator. The network resources coordinator can include a knowledge store, a rules library, a rules engine, and an orchestrator. The knowledge store can have stored thereon facts representative of a present state of the network. The rules library can include production rules representative of knowledge of the network and of the users. The orchestrator can receive service requests from users and use the rules engine in conjunction with the production rules and facts of the knowledge store to: determine network resources required and available for requested services, dynamically make automated decisions with respect to the network and the users, detect changes in the network and react to the detected changes in an automated fashion, and enforce constraints of the network.

The knowledge store can have a plurality of abstraction stores, such as a business store that provides views and alerts corresponding to the network operator and the users, a service store that exposes reservable network resources, a network operator store that maps services onto the network infrastructure, and an infrastructure store that represents devices of the network infrastructure deployed by the network operator. The business store can reflect provisioning, allocation, and deletion of network resources for services offered by each user and the status of each offered service. The service store can reflect services supported by the network and the status of each supported service. The network operator store can reflect the status of the network infrastructure onto which services are mapped. The infrastructure store can reflect the status of each hardware component of the network infrastructure controllable by the network operator. The network resources coordinator can also include a portal through which the orchestrator can receive the service requests from the users and through which the network operator can access the network services coordinator.

In one embodiment, a network management system can include a network resources coordinator and a controller configured to apply changes to hardware components of the network infrastructure under direction of the orchestrator of the network resources coordinator. The controller can also be configured to automatically update the knowledge store when states or settings of the hardware components of the network infrastructure change. The network management system can also include a listener agent configured to detect errors in the network and automatically update the knowledge store of the network resources coordinator to reflect detection of the errors.

In one embodiment, a data network can be configured to allow a plurality of users to connect with each other over the network. The network can include a network infrastructure operated by a network operator, and a network management system configured to dynamically manage connections between the users over the network. The network can be an open access computer network. The network infrastructure can include communication media and switches.

In one embodiment, a system can include a data network having a network infrastructure operated by a network operator, a plurality of users that connect with each other over the network, and a network management system that automatically and dynamically manages connections between the users over the network. The network management system can include a network resources coordinator having a knowledge store, a rules library, a rules engine, and an orchestrator. The network resources coordinator can also include a portal. The network management system can also include a controller and a listener agent.

In one embodiment, a method of automated management of a data network can be performed. The network can have network resources and a network infrastructure operated by a network operator. The method can include requesting, by a subscriber, a service from a service provider; dynamically allocating network resources required to realize the requested service over the network; dynamically provisioning the allocated network resources; providing, by the service provider, the requested service to the subscriber using the provisioned network resources; and dynamically monitoring use of the provisioned network resources associated with the provided service.

In one embodiment, a system can include a data network having network resources and a network infrastructure operated by a network operator; a subscriber; and a service provider. The system can be configured to perform a method of automated management of the data network with respect to the network, the subscriber, and the service provider.

In one embodiment, a computerized method can be performed at a computer device. The method can include receiving from a first user a request for a service from a second user; dynamically allocating network resources of a data network necessary to establish the requested service between the first and second users over the network; dynamically provisioning the allocated network resources to establish the requested service between the first and second users over the network; and dynamically monitoring the provisioned network resources associated with the established service. The network can have a network infrastructure operated by a network operator. The first and second users can both be subscribers or can respectively be a subscriber and a service provider. The request for the service can be received by a network orchestrator. A computer readable medium can have stored thereon instructions that when executed by a processor cause the method to be performed.

In one embodiment, a system can include first and second data networks respectively having network infrastructures operated by first and second network operators, a plurality of users, a plurality of users that connect with each other over the first and second networks, and a network management system that automatically and dynamically manages connections over the first network.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like numerals designate like elements. Furthermore, multiple instances of an element may each include separate letters appended to the element number. For example two instances of a particular element "20" may be labeled as "20*a*" and "20*b*". In that case, the element label may be used without an appended letter (e.g., "20") to generally refer to every instance of the element; while the element label will include an appended letter (e.g., "20*a*") to refer to a specific instance of the element.

DETAILED DESCRIPTION OF THE PREFERRED EMBODIMENTS

Figure 1:
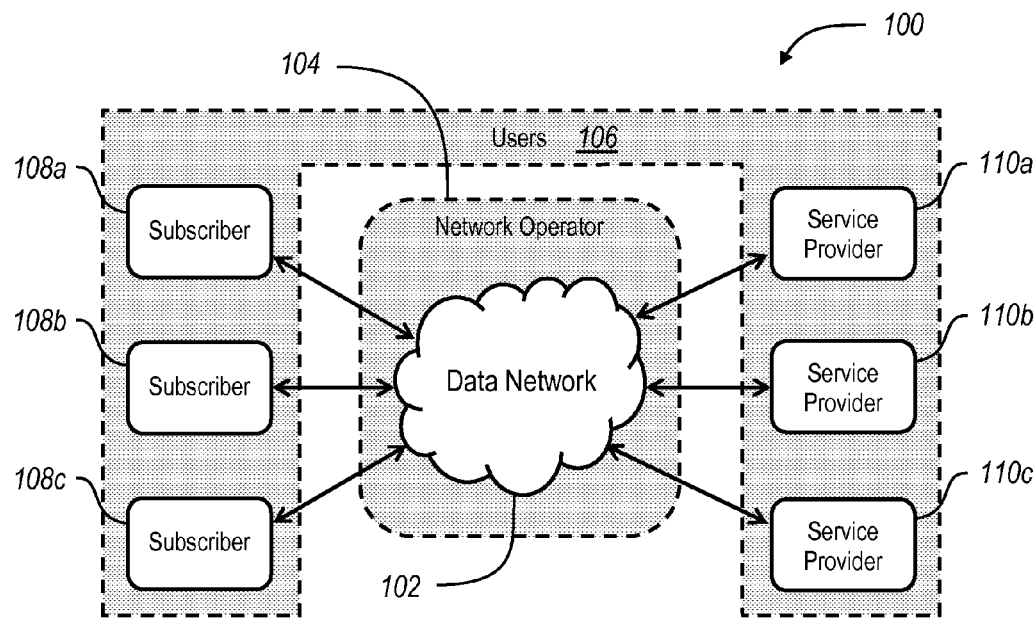
FIG. 1 is a block diagram of a system in which embodiments of the present invention can be used.

In the following detailed description, reference is made to the accompanying drawings, which form a part hereof. In the drawings, similar symbols typically identify similar components, unless context dictates otherwise. The embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. It will also be understood that any reference to a first, second, etc. element in the claims or in the detailed description, is not meant to imply numerical sequence, but is meant to distinguish one element from another unless explicitly noted as implying numerical sequence.

In addition, as used in the specification and appended claims, directional terms, such as "top," "bottom," "up,"

"down," "upper," "lower," "proximal," "distal," "horizontal," "vertical," and the like are used herein solely to indicate relative directions and are not otherwise intended to limit the scope of the invention or claims.

The present invention relates to methods, systems, and computer program products for the automated management and control of data networks through programmability. In particular, embodiments of the present invention provide innovative devices, systems, and methods that allow users of data networks to quickly and easily connect with each other over the network to allow services to be provided therebetween. Various embodiments of the present invention can be used to perform the following novel actions:

- optimize network virtualization or slicing,
- automate configuration, allocation, and provisioning of network resources,
- enable users to browse for and request available services,
- allow users to configure network resources including class of service and bandwidth,
- allow users to monitor slice(s) allocated to them,
- allow network actors to receive automated alerts of network faults, and
- report performance data to all network actors.

Embodiments of the present invention relate to a network management system where an end user, also generally known as a subscriber can provision network services and reserve dynamic connections and bandwidth. This system can leverage automated network management to provide separate views to each actor in the network. The system can enable users to provision, access, and view the state of their specific network slice. The flow of information can be dependent on a rules engine and knowledge store which can provide a mechanism to accurately implement relevant actions. Embodiments of the present invention can give the subscriber control over their slices(s) of the network and can facilitate the provisioning of network resources and connections in a manner that can eliminate manual intervention and lower costs to the network operator.

Embodiments of the present invention may comprise or utilize one or more special purpose or general-purpose computers, each including computer hardware, such as, for example, one or more processors and system memory, as discussed in greater detail below. Embodiments within the scope of the present invention may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least different kinds of computer-readable media: computer storage media and transmission media.

Computer storage media includes RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

When information is transferred or provided over a network or another communications connection (either hardwired, wireless, or a combination of hardwired and wireless) to a computer, the computer properly views the connection as a transmission medium. Transmission media can include network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface controller (NIC)), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A "network" is defined as one or more data links that enable the transport of electronic data between computer systems and/or modules and/or other electronic devices. By way of example and not limitation, common network environments that can be used with the present invention include Local Area Networks ("LANs"), Wide Area Networks ("WANs"), and Open Access Networks ("OANs"), individually or combined. Accordingly, each of the computer systems as well as any other connected computer systems and their components, can create message related data and exchange message related data as needed (e.g., Internet Protocol ("IP") datagrams and other higher layer protocols that utilize IP datagrams, such as, Transmission Control Protocol ("TCP"), Hypertext Transfer Protocol ("HTTP"), User Datagram Protocol ("UDP"), etc.) over the network.

Those skilled in the art will appreciate that the invention may be practiced in network computing environments with many types of computer system configurations, including: personal computers, desktop computers, laptop computers, message processors, hand-held devices, multi-processor systems, microprocessor-based or programmable consumer electronics, network PCs, minicomputers, mainframe computers, tablet devices, mobile telephones, PDAs, pagers, routers, switches, video game consoles, and the like. The invention may be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entity's data center or "in the cloud."

In this specification and in the following claims, a "network operator" is defined as the entity that manages and controls a network and facilitates sharing of the network between various users. In some embodiments, the network operator also owns the network. The term "users" is defined herein as those entities that can provide and/or receive services over the network; "users" is generally divided into "subscribers" and "service providers" as discussed below. The term "actors" refers to all of the entities that can access or use the network, including the network operator, the subscribers, and the service providers.

In embodiments of the present invention, network infrastructure and operations are contemplated to be separate and distinct from the services that run over the network. One objective of separating network transport from services is to dynamically enable and support a plurality of service providers to offer services over the infrastructure in an isolated, automated, and seamless manner. Further, network automation is intended to diminish or even eliminate barriers to entry for service providers and thereby create an ecosystem which encourages growth and innovation in service offerings.

FIG. 1 is a block diagram that depicts an example of a system 100 that can incorporate elements of the present invention. System 100 is exemplary only and does not show every element envisioned in every system. One skilled in the art will appreciate that system 100 can be modified and optimized based on the individual needs of the particular users.

An operating environment for the devices of system 100 may comprise or utilize a processing system having one or more microprocessors and system memory. In accordance with the practices of persons skilled in the art of computer programming, embodiments of the present invention are described below with reference to acts and symbolic representations of operations or instructions that are performed by the processing system, unless indicated otherwise. Such acts and operations or instructions are referred to as being "computer-executed," "CPU-executed," or "processor-executed."

At the heart of system 100 is a data network 102 that is programmable, such as an open access network (OAN). An OAN refers to a data network in which the network operator and the users each have the ability to configure services. As discussed above, many examples of OANs presently exist and the devices and methods discussed herein should be usable with any of those networks. Of course, those OANs are exemplary only and other types of OANs are also possible. In addition, other types of data networks can also be used.

OANs provide a network with inherently attractive features of high capacity and low latency. The services offered by service providers on conventional OANs often degenerate to a choice between a small number of "regular" internet service providers (ISPs). Although a high capacity, low latency connection is in and of itself attractive with such service offerings, there appears to be a lack of services and applications that fully exploit these capabilities. Such services can include interactive IPTV, home security and automation, smart grid utilities, medical monitoring, virtual private networks, and emergency services, among others. This lack of innovative services and applications appears to be a direct consequence of the lack of automation in the network management and operations in open access networks. Embodiments of the present invention can serve to remedy this problem.

Although the discussion herein is mainly directed to the use of an OAN as the data network, other types of data networks can alternatively be used. For example, the data network can be a LAN, a WAN, an enterprise network, a software defined network (SDN), etc., individually or combined.

FIG. 1 depicts the major actors in open access network 102. These actors can include a network operator 104 and one or more users 106. Network operator 104 operates network 102 and facilitates the sharing of network 102 and its corresponding infrastructure between users 106. Network operator 104 can also own network 102, although this is not required. Users 106 are all other actors who provide or receive services over network 102. Users 106 can be categorized as subscribers 108 (such as subscribers 108a, 108b, 108c), who primarily receive services, and service providers 110 (such as service providers 110a, 110b, 110c), who primarily provide services.

Figure 2:
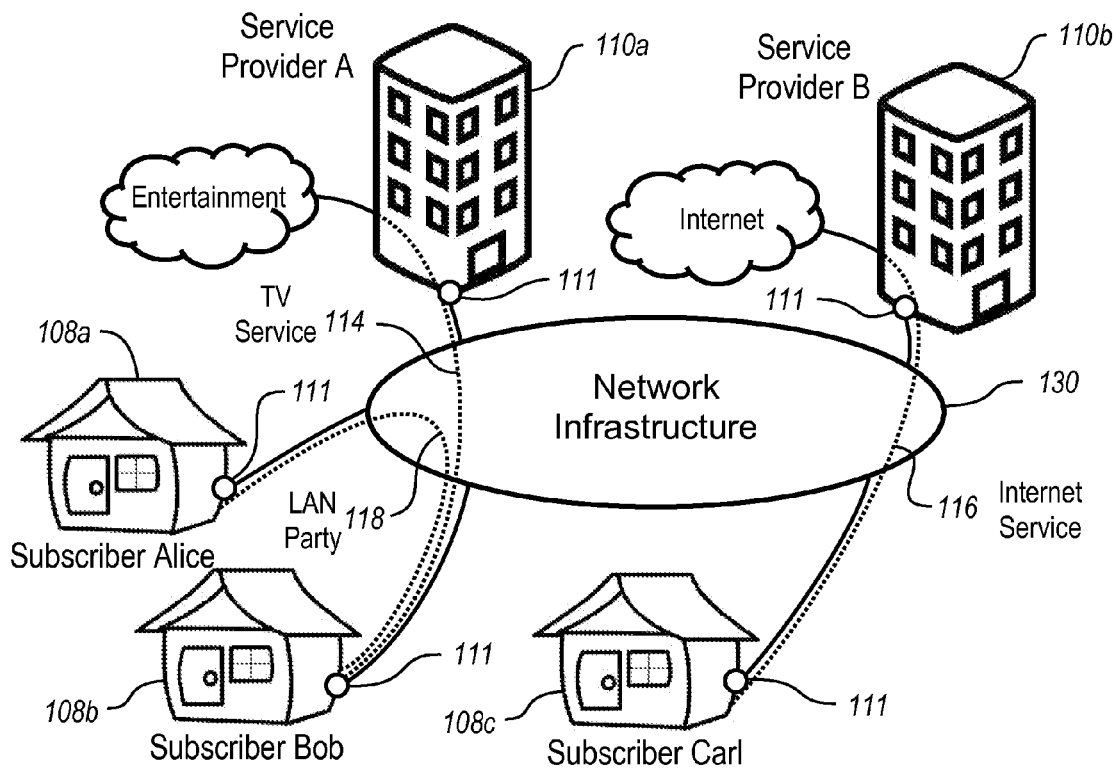
FIG. 2 depicts an example of actors and services that can be supported using embodiments of the present invention.

As depicted in FIG. 2, subscribers 108 and service providers 110 attach to network 102 through end points 111. Subscribers 108 and service providers 110 have equal opportunity to provide or receive services from other users over network infrastructure 130; however, to avoid confusion the terms "subscriber" and "service provider" will be used herein to denote a user's primary purpose. For example, in FIG. 2 service provider 110a provides entertainment services (represented by dashed line 114), such as, e.g., television, gaming, or video to subscriber Bob 108b and service provider 110b facilitates Internet connectivity (represented by dashed line 116) to subscriber Carl 108c.

Although categorized according to their primary purpose, subscribers 108 and service providers 110 are not limited thereto in embodiments of the present invention. For example, in FIG. 2 subscriber Alice 108a and subscriber Bob 108b have set up a "LAN party" (represented by dashed line 118) over network infrastructure 130 without the intervention of a traditional service provider, demonstrating that subscriber Alice 108a and subscriber Bob 108b can act as service providers in addition to subscribers, when desired. Thus, in contrast to conventional open access networks, embodiments of the present invention can allow subscribers 108 and service providers 110 the same opportunities to configure services with other users.

Each user 108 and 110 connects to network 102 through one or more end points 111, which act as a demarcation point between the responsibility of network operator 104 and the user. The physical equipment required for each subscriber 108 and service provider 110 to connect to network 102 at end point 111 depends on the network design of network operator 104 and on potential secondary equipment required by service providers 110. A common practice for network operators 104 is to install a Network Interface Device (NID) at each subscriber site as end point 111. A network cable or fiber enters the NID from the network side and wiring exits the NID into the subscriber site. The signals that pass through the NID are converted therein so that data can pass between the subscriber site and network 102. The subscriber site may have a single computer device that attaches to network 102 through the NID. Alternatively, the subscriber site may have its own separate network that attaches to network 102 through one or more NIDs, such as, e.g., a home network in a residence or an enterprise network in a business. The separate network can be wired and/or wireless, as is known in the art. NIDs can be set up for many different configurations of subscriber site setup, as is known in the art.

In an alternative embodiment, instead of a conventional NID, a virtual broadband gateway/provider edge (VBG/PE) switch 112 (see FIG. 10) can be used for end point 111. A VBG/PE includes a provider edge switch on the network side and a virtual broadband gateway on the subscriber side. The signals that pass through the VBG/PE are converted therein so that data can pass between the subscriber site and network 102. Using VBG/PE 112, a virtualized network can be used at the subscriber site, which can allow the responsibility of network operator 104 to extend into the subscriber's home or business. This can allow for better service and provide other benefits, as discussed below.

As discussed above, network management of conventional systems is performed manually, which can be very complex and time consuming. However, using embodiments of the present invention, the management of a network can be automated and simplified by separating the network infrastructure and operations management from the services that run over the network.

Figure 3:
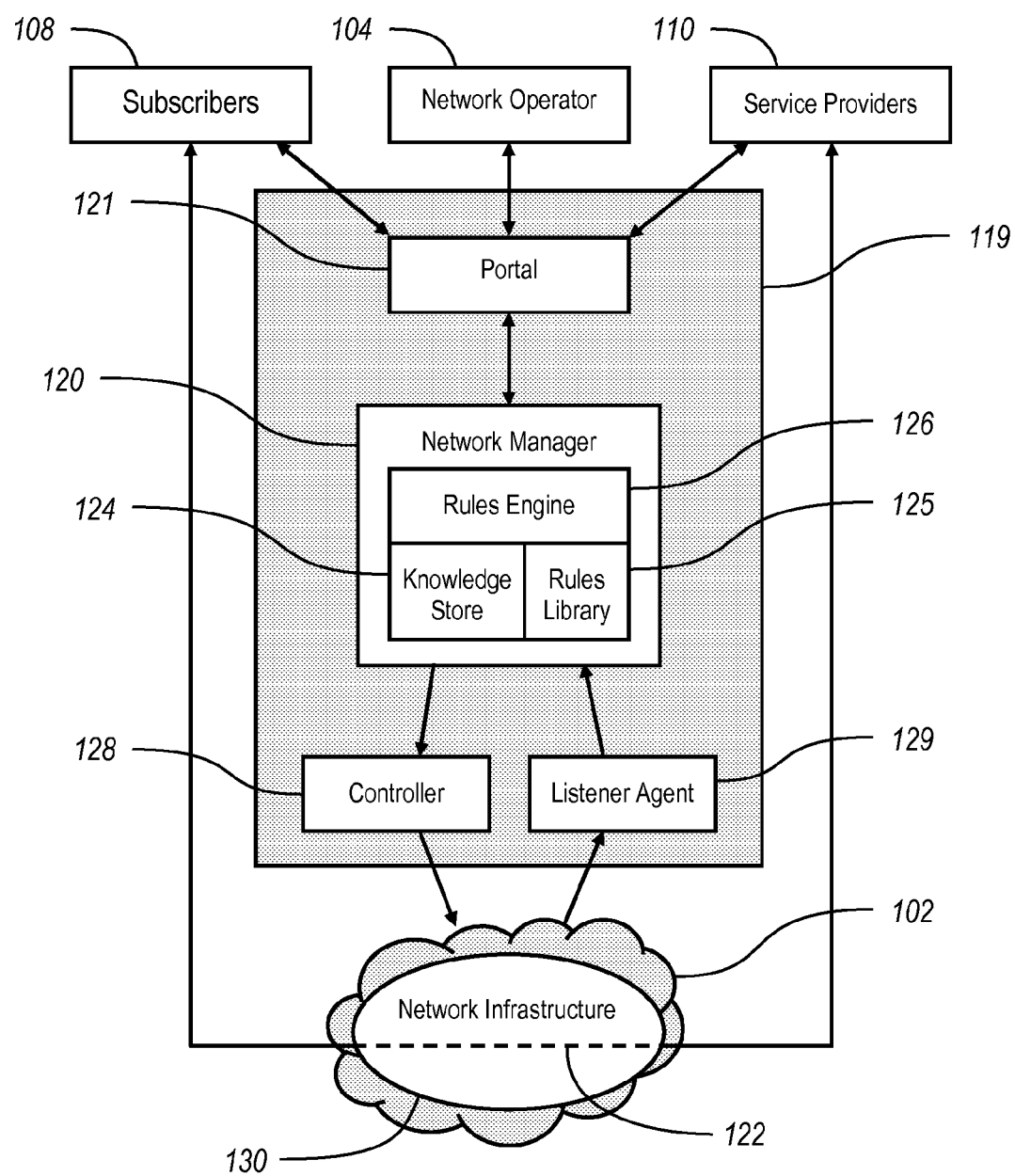
FIG. 3 is a block diagram of a system that incorporates a network management system according to one embodiment.
Figure 4:
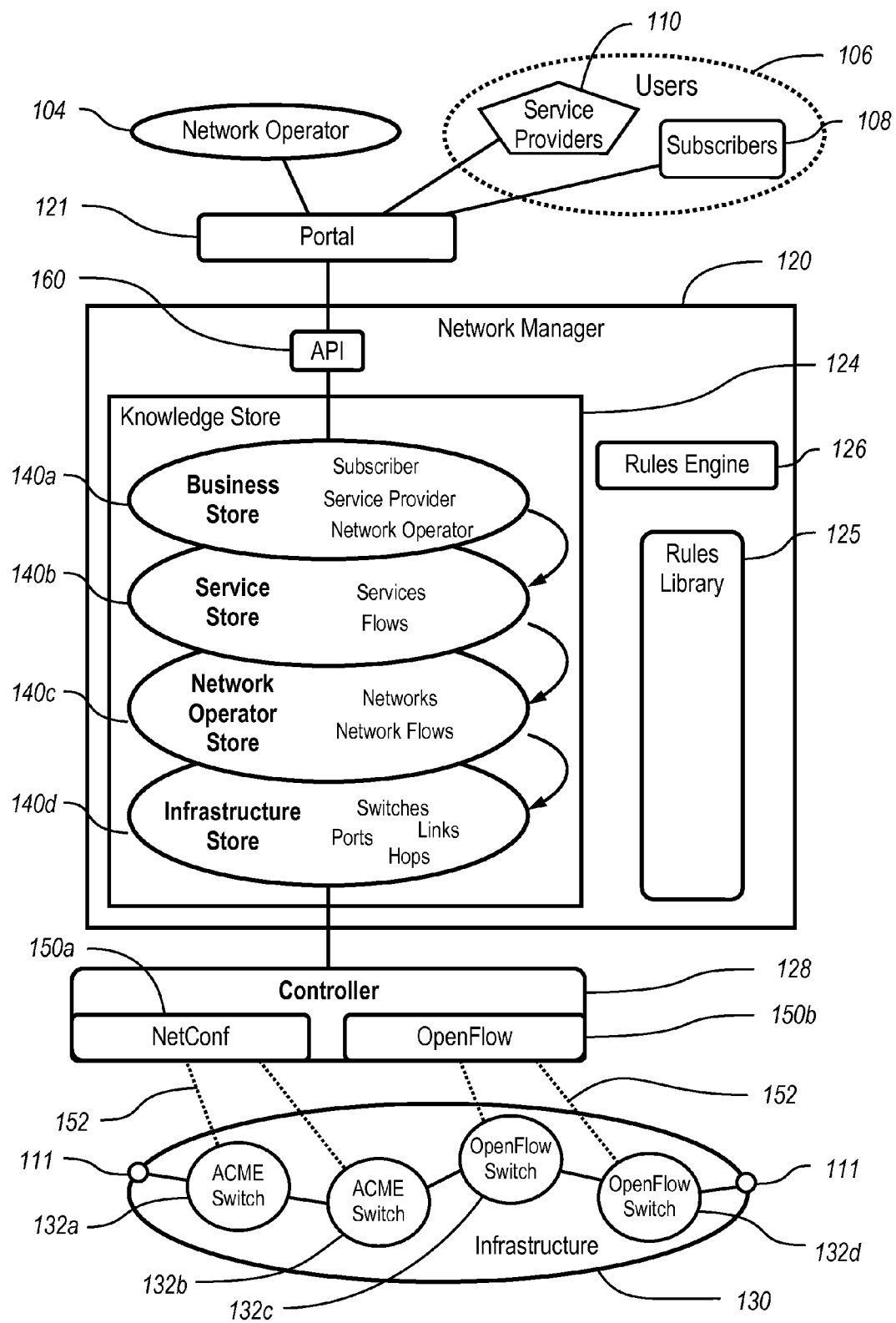
FIG. 4 depicts the network management system of FIG. 3 in more detail, having a network manager that uses abstraction stores according to one embodiment.

FIG. 3 is a block diagram illustrating a network management system 119 according to one embodiment, that is employed to automatically and dynamically manage and control connection pathways (represented by dashed line 122) between users 108 and 110 through a network infrastructure 130 of data network 102. Network infrastructure refers to the physical structure of the network and can comprise the physical resources/devices used therein, such as switches, NIDs, VBG/PEs, communication media (e.g., cables and fibers), gateways, routers, etc., as is known in the art. For example, FIG. 4 shows various devices or resources 132 (132a-132d) that can be typically used as part of network infrastructure 130.

All or portions of network management system 119 can be implemented in a standalone hardware device that can be coupled to network 102 and can be positioned anywhere that an electronic data connection can be set up between network management system 119 and all of the actors 104, 108, 110 and network 102. Alternatively, all or portions of network management system 119 can be implemented in software in one or more computer devices that are attached to network 102. In one embodiment, all or portions of network management system 119 can be virtualized, can be in "the cloud," or can be implemented in other various manners.

As depicted in FIG. 3, network management system 119 can include a portal 121, a network manager 120, a controller 128, and a listener agent 129. In general, all of the network actors discussed above—network operator 104, subscribers 108, and service providers 110—can communicate with network manager 120 through portal 121 to establish, manage, and terminate connections between users to support services over network 102. The actors can also receive indications of network problems, such as connection errors and other information from network manager 120 through portal 121. Network manager 120 can perform these functions by managing network infrastructure 130 through controller 128 and receiving information about network infrastructure 130 through listener agent 129 so as to provide and keep track of connection pathways 122 between the various users 108, 110.

Portal 121 can be used to provide access for all of the actors into the network manager. Portal 121 can create "slices" for each user and allow the actor associated with each slice to access network manager 120 to set up services, monitor services, etc. Portal 121 can provide an interface, such as a GUI, to each network actor. Portal 121 can be an application designed as a window into network manager 120. For example, portal 121 can be a web server having an API into network manager 120. Other types of portals can also be used. In some embodiments, portal 121 is omitted so that the network actors can have direct access into network manager 120.

At the heart of network management system 119 is network manager 120. Network manager 120 can be configured to separate management of the network infrastructure and the operations from the network services through the use of a knowledge store 124, a rules library 125, and a rules engine 126. Knowledge store 124 maintains information about the network and the network actors, rules library 125 contains rules relating to the network, and rules engine 126 applies the rules in rules library 125 to the information in knowledge store 124 to dynamically make automated decisions with respect to the network. By virtue of knowledge store 124, rules library 125, and rules engine 126, and in conjunction with controller 128 and listener agent 129, network manager 120 can facilitate the automatic setting up and configuring of complex high-level tasks, such as, e.g., setting up new services, as well as the automatic detection and handling of low-level errors, as discussed below. Knowledge store 124, rules library 125, and rules engine 126 will be discussed in greater detail below.

In one embodiment, network manager 120 can be used for operations, administration, maintenance, and provisioning (OAMP) and/or troubleshooting (OAMPT) of network 102. In those embodiments, network manager 120 can alternatively be known as an OAMP manager or an OAMPT manager.

In one embodiment, FlowOps is employed to perform the various management functions of network manager 120. FlowOps is a network management and operations framework, designed by the present inventors, that can provide structured, automated network management for heterogeneous data network environments. FlowOps can also form the basis for a "truly open", or dynamic OAN, in which becoming a service provider becomes a dynamic, low-barrier to entry, event. In particular, FlowOps can model the dependencies and relationships of the network infrastructure and network actors of a data network, thereby allowing for the automation of network management functions within the broader business context of data networks. FlowOps can be used as part of an OAMP or OAMPT manager.

FlowOps can support both traditional and software defined network (SDN) based network devices. Among other things, FlowOps can enable network operators to: (i) operate a data network in an automated, sustainable manner, (ii) reason about various levels of abstraction of the network, and (iii) provide a streamlined, unified, value-added experience to users.

In FlowOps, network management and operations tasks involve applying domain specific logic to realize network management objectives based on information derived from the present (i.e., dynamic) state of the network. As such, production rules can be used to reason about and represent knowledge of the domain, and those rules can be applied to a working memory of assertions (or facts) representing the volatile state of the system. As such, in FlowOps, a production rule system can be used as the basis for the approach and the production rules and facts can be stored in rules library 125 and knowledge store 124, respectively.

Production rule systems (or rule-based systems) can provide a practical way to capture domain knowledge in a set of production rules and to have those rules operate on the state of the system in question, represented as assertions (or "facts"). The "working memory" in which the facts are stored can act like a traditional database, except that the working memory can be more volatile as it can change during the operation of the system.

To facilitate a production rules approach, information about network 102, such as the actors, services, infrastructure, and other information associated with network 102 can be stored in knowledge store 124 as facts. In addition, state information regarding network 102 can be maintained in knowledge store 124 and updated as changes are made or detected in the network, such as services getting configured, faults occurring, etc. Production rules representative of knowledge of network 102 and of subscribers 108 and service providers 110 can be contained in rules library 125. In essence, knowledge store 124 and rules library 125 can contain the facts and rules necessary to make decisions regarding network 102 and the actors 104, 108, and 110 associated therewith.

In some embodiments, FlowOps employs a layered abstraction model which can allow FlowOps to reason and react to events at different levels of abstraction and to propagate relevant information into other layers as needed. As a result, FlowOps can be used with almost any type of underlying network hardware as long as network 102 can support the abstractions that service providers 110 need to provide services. As such, in these embodiments, network infrastructure 130 can comprise traditional switches, SDN-enabled switches, or a combination of the two, in addition to communication media and other typical network components.

The abstraction can neatly map onto the most common generic network management and operations problem that plagues conventional networks: human network operators. In conventional networks, human network operators must apply domain knowledge to perform network management and operations tasks within the network, using information about both the desired state and the observed state of the network. This can be extremely challenging because the network state can dynamically change as network conditions change or as a result of operator actions and human operators may find it difficult, if not impossible, to keep up. Even if a human operator can keep up with network changes, a large amount of manual labor is typically required to do so. This is a big reason why conventional OANs typically support only a small number of service providers; having more than just a few service providers overloads human operators so they simply cannot keep up. Automating some or all of network management can diminish or even eliminate the overload problem. This can be accomplished using embodiments of the present invention.

To facilitate a layered abstraction model, layered abstraction stores can be used in knowledge store 124 to maintain information stored within the knowledge store. Various facts can be stored in different layered stores. Abstraction stores can provide simplified automated management of the entire system at different levels and can separate potential problems in the network. In addition, abstraction stores can simplify management of complex network problems and can allow complex high-level definitions to be mapped to low level details. A layered abstraction model can provide the following benefits:

separation between requested network resources vs. how those resources actually get implemented;
support for allocation, provisioning, and monitoring of received network resources; and
ease of offering relevant views and alerts to each network actor.

Of course, other benefits are also possible.

FIG. 4 illustrates one embodiment in which four layered abstraction stores 140 (140a-140d) are used in knowledge store 124. Of course, more or fewer abstraction stores are also possible. Abstraction stores 140 include a business store 140a, a service store 140b, a network operator store 140c, and an infrastructure store 140d, stacked on top of each other in the order shown.

Business store 140a provides views and alerts to the actors 104, 108, and 110 that use network 102. For example, through business store 140a, subscribers 108 can view a list of available services to request as well as information corresponding to those services. In addition, subscribers 108 and/or service providers 110 may be able to view the status of services already requested, such as, e.g., whether network resources have been provisioned, allocated, and/or deleted, as discussed below. Through business store 140a, subscribers 108 and/or service providers 110 can also request services, cancel services, and view information about each service, such as measured speed of service, actual bandwidth, etc. In addition, subscribers 108 and/or service providers 110 can receive alerts corresponding to the services they receive or supply when errors are detected on network 102 or when planned network maintenance is scheduled that affect those services.

Service store 140b exposes reservable network resources. As such, each service provided on network 102 can be described in service store 140b with respect to the network resources required to provide the service. For example, a VLAN from point A to point B or a LAN with multiple end points can be defined in service store 140b by the types of network resources required. In one embodiment, service store 140b defines the services that can be provided in network 102 and leaves the implementation details to network operator store 140c.

Network operator store 140c maps services onto appropriate networks and determines network flows therethrough. For example, provided services like the VLAN or LAN examples discussed above can be mapped onto a backbone infrastructure in network operator store 140c. The mapping can be dependent on the manner in which network operator 104 runs the backbone network. For example, one network operator might provide VLAN and LAN service abstractions by configuring an actual VLAN through the backbone network, while another may create a VPN over an IP network. Thus, network operator store 140c is set up based on available infrastructure 130 and the services that may be available in service store 140b. As such, in some embodiments, subscribers 108 and service providers 110 need not be concerned with how network operator 104 provides a service.

Infrastructure store 140d represents the physical devices deployed in network 102. As such, infrastructure store 140d can include information about each individual hardware component 132 under the network operator's control, such as, e.g., NIDs, VBG/PEs, switches, communication media (e.g., wires, cables, and fiber), gateways, routers, etc. The information can include specifications of the component, where the component is positioned in the network, links between components, etc.

In general, information (e.g., facts) is automatically passed up and down the abstraction stores as needed, based on the rules stored within rules library 125, as discussed in more detail below.

Rules engine 126 uses the rules of rules library 125 and facts of knowledge store 124 to automatically detect actual network changes as well as requests for network changes and to react accordingly. For example, rules engine 126 can use the rules of rules library 125 and facts of knowledge store 124 to (i) make automated decisions with respect to network 102, subscribers 108, and service providers 110, (ii) detect changes in network 102 and react to the detected changes in an automated fashion, (iii) detect requests for changes in network 102 and react in an automated fashion, and (iv) enforce constraints of network 102. Rules can enforce constraints defined in the system and can be defined to be fired in rules engine 126 when new facts are entered into the system (e.g., when there is a new user or a new service), when facts are removed (e.g., when a user leaves the network or a service is deallocated), or when facts change (e.g., when the status of a network port changes or a service is modified). In one sense, rules engine 126 acts as the brains of network manager 120. In some embodiments, rules engine 126 can "learn" from the rules to improve performance over time.

In embodiments in which abstraction stores 140 are used, rules can act as glue between the layered stores. Many events and facts can be communicated between stores 140 using rules engine 126. For example, rules can be used to detect a request for a new service at a top layered store and propagate that request down to the lowest layered store, so that the network devices can then be set up accordingly, as discussed below. As another example, rules can be used to detect when an error has occurred at the lowest layered store and propagate that information up to the highest layered store to notify affected network users, also as discussed below.

If desired, an open source production rule system can be used for network manager 120. For example, in one embodiment Drools, an open source production rule system, can be used as the basis for abstraction stores 140, rules library 125, and rules engine 126. Other production rule systems, both open source and not, can alternatively be used, such as, e.g., the CLIPS production rule system, discussed below.

Controller 128 is responsible for applying changes to the resources 132 of network infrastructure 130 whenever such a change is required. For example, whenever a service is set up or removed between network users, controller 128 can apply required changes to the switches and other devices 132 of network infrastructure 130 to effect the service change. As such, if rules engine 126 acts as the brains of network manager 120, controller 128 is the brawn of network management system 119.

As depicted in FIG. 4, after configurations for infrastructure resources 132 are determined (e.g., to realize a specific service) by rules engine 126, controller 128 can apply required changes to network hardware resources 132 using device drivers 150. In one embodiment, controller 128 automatically determines changes required to one or more hardware devices 132 based on information placed in infrastructure store 140d.

Device drivers 150 (150a, 150b) can configure the infrastructure devices 132 through compatible control interfaces (represented by dashed lines 152). For example, in the depicted embodiment, a NetConf driver 150a and an Open-Flow driver 150b are used to configure ACME switches 132a and 132b and OpenFlow switches 132c, 132d, respectively, via control interfaces 152. By way of example and not limitation, ACME, CLI, NETCONF, and OpenFlow drivers can be used with controller 128. Other drivers can also be used. Device drivers 150 can be incorporated into controller 128, as in the depicted embodiment, although that is not required. Device drivers can alternatively be separate and distinct from controller 128, if desired.

Returning to FIG. 3, listener agent 129 can determine when states and settings change in network 102 by monitoring network infrastructure devices 132. Many conventional listener agents are available and can be used as listener agent 129. By way of example and not limitation, the following devices and/or protocols can be used as listener agent 129: Sflow (an industry standard used to export network traffic data), NetFlow (a specific tool to allow IP network traffic to be collected as it enters and exits a switch), Cacti (an open source network monitoring and graphing tool that presents collected time-series data), SNMP (Simple Network Management Protocol), LLDP (Link Layer Discovery Protocol), and OAM (Operations, Administration, Management).

In some embodiments, controller 128 can also determine when states and settings change in network 102 by monitoring infrastructure devices 132 through drivers 150. In those embodiments, controller 128 can update applicable facts in knowledge store 124 when network changes are detected. In this manner, controller 128 can keep knowledge store 124 up to date so that rules are not applied to facts which are no longer valid.

In one embodiment, controller 128 automatically stores a fact within infrastructure store 140d that includes information about the detected network change, and this fact is automatically detected by rules engine 126. When used with abstraction stores 140 in this manner, controller 128 may be the only portion of network management system 119 that needs to "know" the actual underlying hardware in the network. That is, the different abstraction stores 140 represented in knowledge store 124 can deal with network equipment in an abstract manner, leaving it up to controller 128 to reflect that abstraction on the actual network hardware. This can make it easier to automate the system.

In some embodiments network actors are given access to network manager 120 via a common interface. For example, in the embodiment depicted in FIG. 4, access to knowledge store 124 and rules library 125 by any of the actors 104, 108, 110 is accomplished through an application programming interface (API) 160. That is, for network operator 104, subscribers 108, and service providers 110, access to network manager 120 might be allowed only through API 160. In some embodiments, all of the actors can interact with FlowOps through the common API 160 which can provide all of the functionality needed to configure and manage services. One benefit of using a common interface is that tight control can be maintained by network management system 119 on areas of network manager 120 that are accessible by each of the network actors. Another benefit is that all actors can develop useful, sharable tools that can interact with the resources. In one embodiment, API 160 is a RESTful type of API. In those embodiments that include portal 121, API 160 can be positioned within network manager 120 or between portal 121 and network manager 120 so that the system actors can use portal 121 to access network manager 120 through API 160.

In some embodiments, rules library 125 is incorporated into knowledge store 124. In other embodiments, rules library 125 is positioned external to knowledge store 124 but still within network manager 120. Knowledge store 124 and/or rules library 125 can be positioned on a single hardware device or can be distributed over a plurality of hardware devices. In addition, knowledge store 124 and/or rules library 125 can be positioned in "the cloud."

In some embodiments, a rules repository can be included to allow rules to be stored and shared by a community of users. For example, the rules repository can maintain a library of rules that have been generated by one or more users. The rules repository users can include network operators, network developers, service providers, and others. The rules repository can be a static library, or a dynamic library in which new rules can be submitted periodically to be added to the library. In addition, the rules repository can be an unlimited-access library, or a limited-access library in which access to the library is limited to certain individuals and/or groups. In some embodiments, the rules repository can include both limited-access and unlimited-access sections. The rules repository can be maintained at any location accessible to those for whom it is intended to be used. For example, an unlimited-access rules library might be located on an internet server or the like that provides access to all. In contrast, a limited-access rules library would likely be located on a network where the library will be used. The rules repository can begin with a core library to which rules are added over time by one or more users Network 102 and its various components can be managed using the FlowOps framework in network manager 120. Basic functionality, such as allocation, provisioning, and deletion can be used as building blocks in FlowOps.

The allocation function can be used to reserve one or more network resources 132 for an actor or a service. A successful allocation results in the network resource being reserved for the actor/service for the valid length of an allocation promise. For example, if a subscriber 108 requests a service to be set up, network resources 132 required for the requested service can be allocated to reserve the resources. Allocation does not cause any configuration changes to be made to network resources 132 or infrastructure 130; the resources 132 are simply reserved.

The provisioning function can be used to configure and instantiate network resources 132 that have been allocated. As such, provisioning of an allocated network resource 132 results in configuration changes being made to the resource by controller 128 so that the requested service will be realized through the resource. When all of the allocated network resources 132 have been provisioned for a particular service, the service pathway is realized through the provisioned network resources 132 to realize the service.

The deletion function can be used to release or de-allocate one or more allocated and/or provisioned network resources 132. As such, deletion of an allocated or provisioned network resource 132 releases the resource from its allocation or provision. If needed, configuration changes are made to the provisioned network resource by controller 128 to release the resource from its provision. The deletion function effectively frees the allocated/provisioned network resource so the resource can become available for other network uses. For example, when a service is cancelled or otherwise ended, the deletion function can be used to release all network resources 132 that had been provisioned for the service so the resources can be available for other network uses.

Other basic functions can also be used in addition to allocation, provisioning, and deletion. For example, an update function can be available to change network resources on-the-fly without being required to delete and then reallocate the resources.

Another basic functionality of FlowOps is enabling actors to diagnose problems and examine service levels to ensure that services match what was offered, e.g., network speed, bandwidth, etc. In some embodiments the network operator can have complete access to all service information, while subscribers and service providers are given limited views based on their own particular services. These views can include measurement results, path information, etc. It can be left up to network operator 104 to determine what should be included in a view.

Along with views, subscribers 108 and service providers 110 can automatically receive alerts about important changes in their views. For example, connectivity issues or planned maintenance in network 102, among other things, can cause a change in an actor's view and alerts can be automatically generated based thereon. Having clear views into the network can allow problems to be tracked by all affected actors.

Using the building blocks discussed above, services can be set up, terminated, etc. in network 102 in which network operator 104 has already built out network infrastructure 130. Building out network infrastructure 130 is known to those skilled in the art and typically includes the following: (i) deploying communication media, such as a fiber, cable, or other infrastructure to form the backbone of the network, (ii) deploying network equipment/devices in the backbone to handle the transporting of data packets between users, and (iii) running data lines out to users in such places as homes, data centers, etc. Other manners of building out network infrastructure 130 can also be used, as is known in the art.

In some embodiments, network operator 104 can keep inventory of network devices 132 within network infrastructure 130 and access methods which FlowOps uses to bootstrap the environment. Once network infrastructure 130 is built out and FlowOps is set up, users 106—including subscribers 108 and service providers 110—can start allocating and provisioning network resources 132 for services over network 102.

Figure 5:
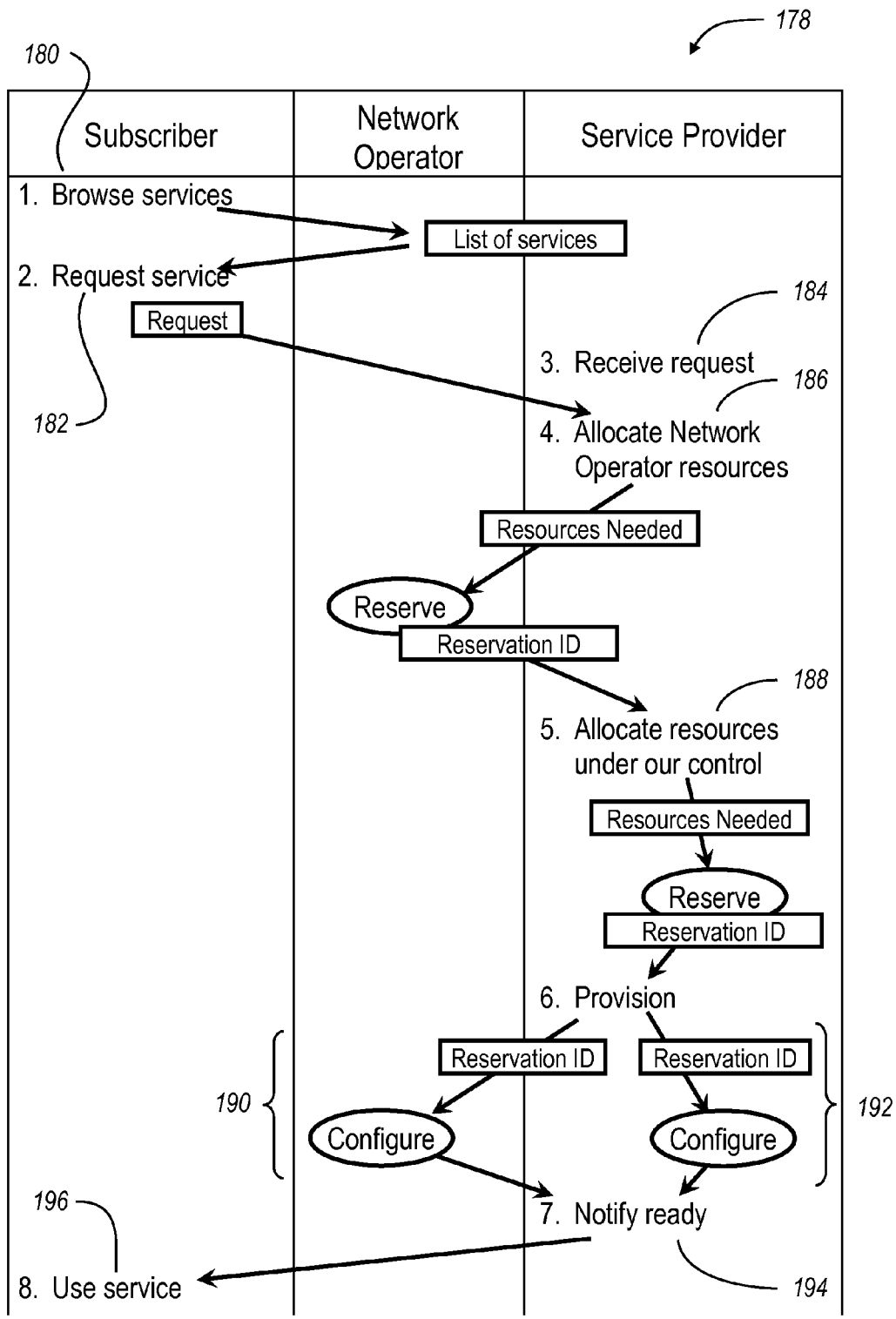
FIG. 5 is a flow diagram illustrating a method of setting up a service between a service provider and a subscriber according to one embodiment.

FIG. 5 depicts one embodiment of a method 178 that can be performed to set up a service that uses data network 102, from initially requesting the service by subscriber 108 to setting up the service by service provider 110. In one embodiment, abstraction stores 140, such as those discussed above, can be used with one or more of the steps.

In step 180, subscriber 108 uses a computer device connected to the network to browse (i.e., view information about) services that are available on the network from one or more service providers 110. In some embodiments, subscriber 108 performs this step through portal 121, which can be, e.g., a web server. The browsed information can be as simple as a list of available services, as in the depicted embodiment, or can include information and options corresponding to each service. In some embodiments, a list is presented and the subscriber can view detailed information about each service by simply clicking on the service.

In addition to selecting a service, the subscriber can also select various options that relate to the service. For example, in some embodiments, the subscriber can also select a level or quality of service, with the higher quality of service presumably costing more. By allowing this level of granularity, embodiments of the present invention can allow subscribers to better customize services to match their needs. It can also allow smaller service providers to use the system.

The browsing and/or selecting of services can be performed in a windows type of computer environment or any other type of computer environment and can use portal 121, for example, to access network manager 121. In addition, the browsing and/or selecting of services can be performed at a desktop or laptop computer, a server device, a mobile device, or any other type of computing device. Alternatively, cloud computing can be used. Other manners of browsing can also be done, as is known in the art.

The list of services and the information about each service can be obtained from knowledge store 124 after having been stored thereon by service providers 110. Some information can include empirical data, such as realized speed or bandwidth, which can be determined automatically by the rules engine and stored in the knowledge store. If the abstraction stores 140 discussed above are used, some or all of the information can be obtained by the subscriber through business store 140*a*.

In a dynamic open access network, there can be many service providers, offering services at various granularities and time scales. For example, some offered services may provide relatively slow network speeds and/or may be for a relatively short period of time; other offered services may provide relatively fast network speeds and/or may be for a relatively long period of time, or not have a time limit. As such, some services may undoubtedly resemble current ISP style "static" and "heavyweight" services, with customer/provider relationships existing over an extended period of time, while other services (or networked applications) can be offered at relatively small granularities and over shorter time scales. For example, the subscriber to subscriber "LAN party" depicted in FIG. 2 might be created on the fly for the duration of a gaming event. The FlowOps architecture is flexible enough to facilitate the creation of innovative services that can exploit the inherent capabilities of a low latency, high capacity dynamic open access network.

Returning to our workflow discussion, in step 182, subscriber 108 requests a desired service from the browsed services through portal 121, for example, using the computer device. In one embodiment, this can be done by simply selecting the desired service when browsing. Of course other manners of requesting services are also possible, as is known in the art. If desired, step 180 can be omitted and the service can simply be requested without browsing. In one embodiment, the subscriber can request the service using the business store 140*a*.

In step 184, the applicable service provider 110 receives the request, for example through portal 121. In one embodiment, this can be done through knowledge store 124 using abstraction stores 140. For example, when a service is requested by subscriber 108 through business store 140*a*, rules engine 126 can detect the request and automatically alert service provider 110.

In step 186, network resources 132 required to realize the requested service are determined and allocated. Service provider 110 can determine network resources 132 that will be needed in the path from service provider 110 to subscriber 108. End points 111 can first be determined corresponding to subscriber 108 and service provider 110. In some embodiments, end points 111 for the requested service can be fixed by network hardware. In other embodiments, end points 111 can be determined by subscriber 108 and/or service provider 110. In some embodiments in which subscriber 108 and/or service provider 110 have multiple connections to network 102, subscriber 108 and/or service provider 110 can determine which end point 111 is to be used by the service or can let any free end point 111 be used. In some embodiments, service providers 110 can configure services through generic or specific end points 111 where the service provider is connected into network 102. For example service provider 110 can provide different services from separate ports or can load balance services between ports. Reserving end points 111 can include mapping generic points to available points so that the service reservation includes information indicating exactly where the service will be configured.

Once end points 111 for the service have been determined, network resources 132 required to complete the path between the end points can be determined. In one embodiment, this can be done by providing to knowledge store 124, by service provider 110 through portal 121, an allocation fact that includes an indication of: the requested service, the service provider providing the service, and the subscriber receiving the service. In response to this new allocation fact, rules engine 126 can identify network resources 132 that need to be allocated based on the allocation fact. In one embodiment, identifying network resources 132 to be allocated can be accomplished by adding a service fact to knowledge store 124, mapping the service identified in the service fact to network infrastructure 130, and identifying network resources 132 based on the mapping. In one embodiment, this can be accomplished using abstraction stores 140 of knowledge store 124. For example, FIGS. 6A and 6B depict one embodiment in which abstraction stores 140 are employed to determine and allocate network resources 132 for a service between service provider 110 and subscriber 108.

Figure 6A:
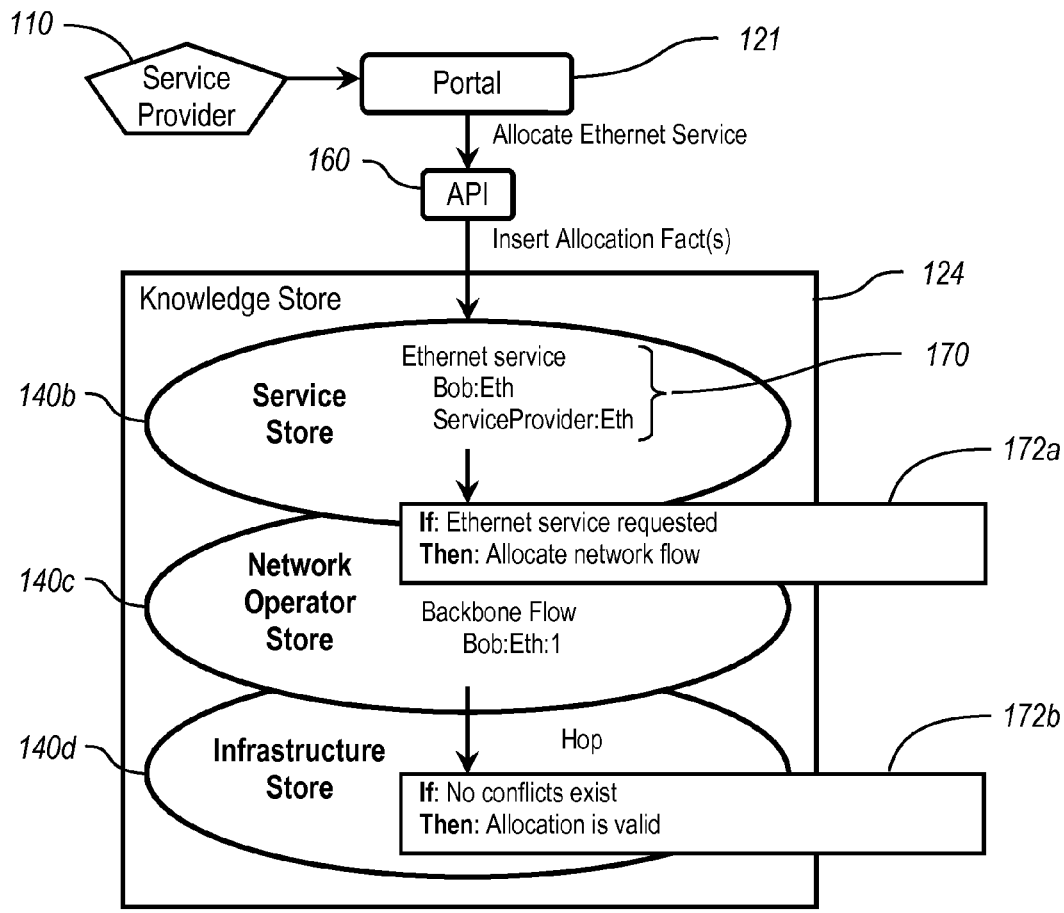
FIG. 6A illustrates a method of allocating network resources using abstraction stores according to one embodiment.
Figure 6B:
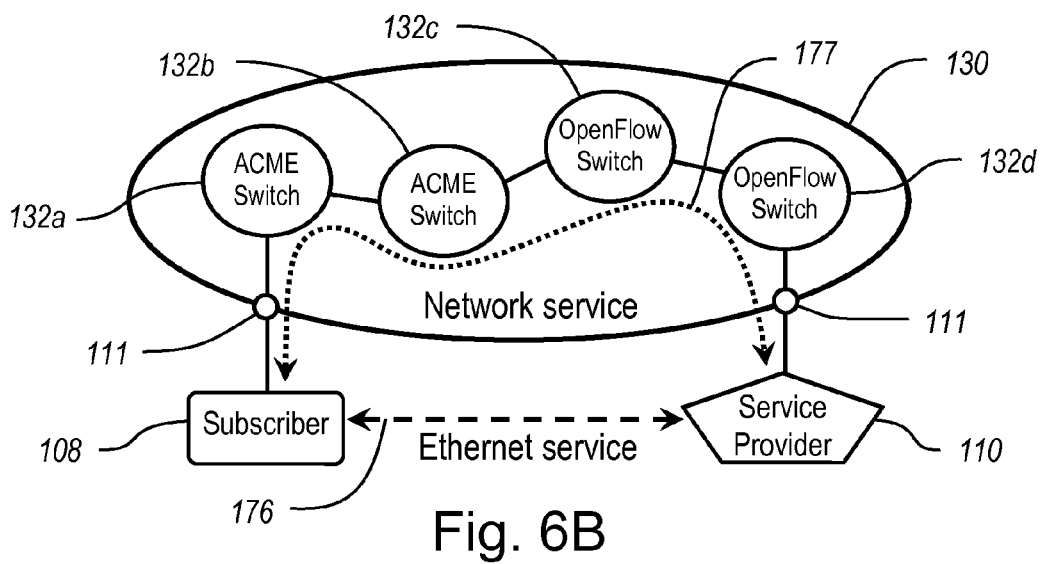
FIG. 6B depicts an example of a service that can be set up between a service provider and a subscriber according to one embodiment.

As shown in FIG. 6A, when a service is requested from service provider 110, a service fact 170 can be added to service store 140*b*. Service fact 170 can include information about the requested service, including identifying the subscriber, the service provider, and the requested service. If the service request has been placed using network 102, service fact 170 can be automatically added to service store 140*b* of knowledge store 124 by rules of rules library 125 that detect new facts corresponding to the request on business store 104*a* when the service request is placed. Alternatively, if the service request is not placed using network 102 (e.g., the request was placed by telephone) or if automatic addition is not desired, service fact 170 can be added to service store 140*b* by service provider 110 through business store 104*a*. In the depicted embodiment, service provider 110 accesses the abstraction stores via API 160 and portal 121.

Rules engine 126 can automatically detect when new fact 170 is added to service store 140*b*. Rules engine 126 can use rules 172 of rule library 125, such as rules 172*a* and 172*b*, in conjunction with the information included in new fact 170 to attempt to map and allocate the required network resources 132 using abstraction stores 140. For example, if an Ethernet service has been requested (such as Ethernet service 176 shown in FIG. 6B), then rule 172*a* in network operator store 140*c* can map the requested Ethernet service to a particular network flow. If the network operator 104 uses VLANs in the backbone to support such services, then the network can be a backbone VLAN. As such, rules applied to network operator store 140*c* can be used to determine if a possible path exists through network 102 that will support the requested service. Once a possible network path has been determined, such as path 177 in FIG. 6B, the required network resources 132 along path 177 can be identified.

Once the network resources 132 along network path 177 have been identified, the availability of the identified resources 132 can be determined using infrastructure store 140*d*. If any of the identified network resources 132 are not available, network operator store 140*c* and infrastructure store 140*d* can be used to determine alternative network paths around the unavailable resource(s) and the availability of network resources 132 corresponding to the alternative paths.

Each of the available network resources 132 along the identified network path 177 can be allocated to reserve the resource for service 176. If allocation of all of the identified network resources 132 of the original or alternative path 177 is successful, then allocation for the requested service 176 is accomplished and the allocation is valid, as indicated by rule 172b. Allocation of a network resource means that the available network resource 132 is promised but not yet given to the requestor (e.g., service provider 110) for use with requested service 176.

Some services may only require configuration in the network operator's network 102. Other services may also require configuration of network resources under separate control of service provider 110. For example, in FIG. 10, service provider 110 has its own network 142 whose resources may also require configuration to realize the requested service. In other embodiments, other networks may also be required. For example, FIG. 11 depicts one embodiment in which three networks are involved, a first network 102A to which the subscribers are directly connected, the service provider's network 142, and a third network 102B that acts as an intermediate network between the other two networks 102A and 142. This can occur, for example, when one telecommunications network uses a cell tower of another telecommunications network. Other configurations are also possible. When using multiple networks, all of the networks may use network managers 120. Alternatively, hybrid networks may be set up so that one or more of the networks incorporate network managers 120 while one or more of the remaining networks do not. Returning to FIG. 5, for multiple network systems optional steps 188 and 192 can be performed.

In step 188, service provider 110 dynamically determines and allocates resources in the service provider's network. This can be accomplished in a similar manner as step 186, or in any other allocation process typically used by the service provider. Step 188 can be repeated for each additional network as needed.

If step 186 (and step 188, if used) is successful in allocating all of the identified network resources 132, then step 190 (and step 192, if required) is performed.

In step 190, allocated network resources 132 are dynamically provisioned to realize the requested service 176. This means that the network resources are configured as members of network path 177 so that service 176 can be realized therethrough. Thus, the configuration can be prepared for each allocated network resource 132 along network path 177. To provision the allocated network resources, controller 128 can translate the configuration for each network resource 132 and apply necessary changes to the resource using the corresponding device driver 150. In one embodiment, provisioning can be done by providing to knowledge store 124, by service provider 110, a request to provision allocated network resources 132; determining, by rules engine 126, configurations for the allocated network resources 132; and applying the configurations, by controller 128, to the allocated network resources 132.

In optional step 192, allocated network resources of the service provider's network are also provisioned. This can be done in a similar manner to step 190, or in any other allocation process typically used by the service provider. Step 192 can be repeated for each additional network as needed.

In step 194, once provisioning is complete, the affected network actors are notified through portal 121 that the service has been successfully set up between service provider 110 and subscriber 108. In this step, subscriber 108 can be notified that the service is now available to use. In some embodiments, service provider 110 is also notified of the successful setup, if it does not already know, so service provider 110 can start to provide the requested service 177.

Alternatively, if the allocation or provisioning of one or more network resource 132 (or of one or more network resources in the service provider's network, if required) has failed, the appropriate actors can be notified through portal 121 that the setting up of service 177 has failed. The network resources 132 that have already been allocated for the requested service can also be de-allocated using the deletion function discussed above.

In step 196, subscriber 108 begins using service 176 provided by service provider 110. That is, once all of the allocated network resources 132 corresponding to path 177 of network 102 (and all of the allocated network resources of the service provider's network 142, if used) have been successfully dynamically provisioned, corresponding service 176 is provided by service provider 110 to subscriber 108 using path 177, as shown in FIG. 6B. Once the service is usable, service provider 110 and/or subscriber 108 can monitor the service through portal 121 using automated fault management and other available network service support capabilities provided by network operator 104.

Applicant notes that once service 176 is requested in step 182, any or all of the remaining steps (184-196) of method 178 can be accomplished automatically, i.e., without human intervention, if desired. That is, some or all of the interactions between subscriber 108, service provider 110, and network operator 104 in setting up and using service 176 can be completely automated and programmatic. As a result, adding and removing services can be completely automated actions, performed quickly and easily since human coding is not required, resulting in a dynamic network. Similarly, adding and removing subscribers 108 and service providers 110 can also be done quickly and easily. As a result, OANs and other types of networks can support services and applications that can truly exploit the capabilities of low latency and high capacity access networks.

Although method 178 is directed to the setting up of a service that is requested by a subscriber 108 and provided by a service provider 110, the method can also be used for other combinations with minimal, if any, modifications. That is, method 178 can also be used where the subscriber and/or the service provider are replaced by the other type of user. For example, to set up the "LAN party" 118 depicted in FIG. 2, two subscribers 108 can be used without a service provider 110. That is, subscriber 108a can act as the subscriber and subscriber 108b can act as the service provider in method 178. By doing so, the LAN party 118 can be set up between the two subscribers 108a and 108b without the need for a traditional service provider.

Figure 7:
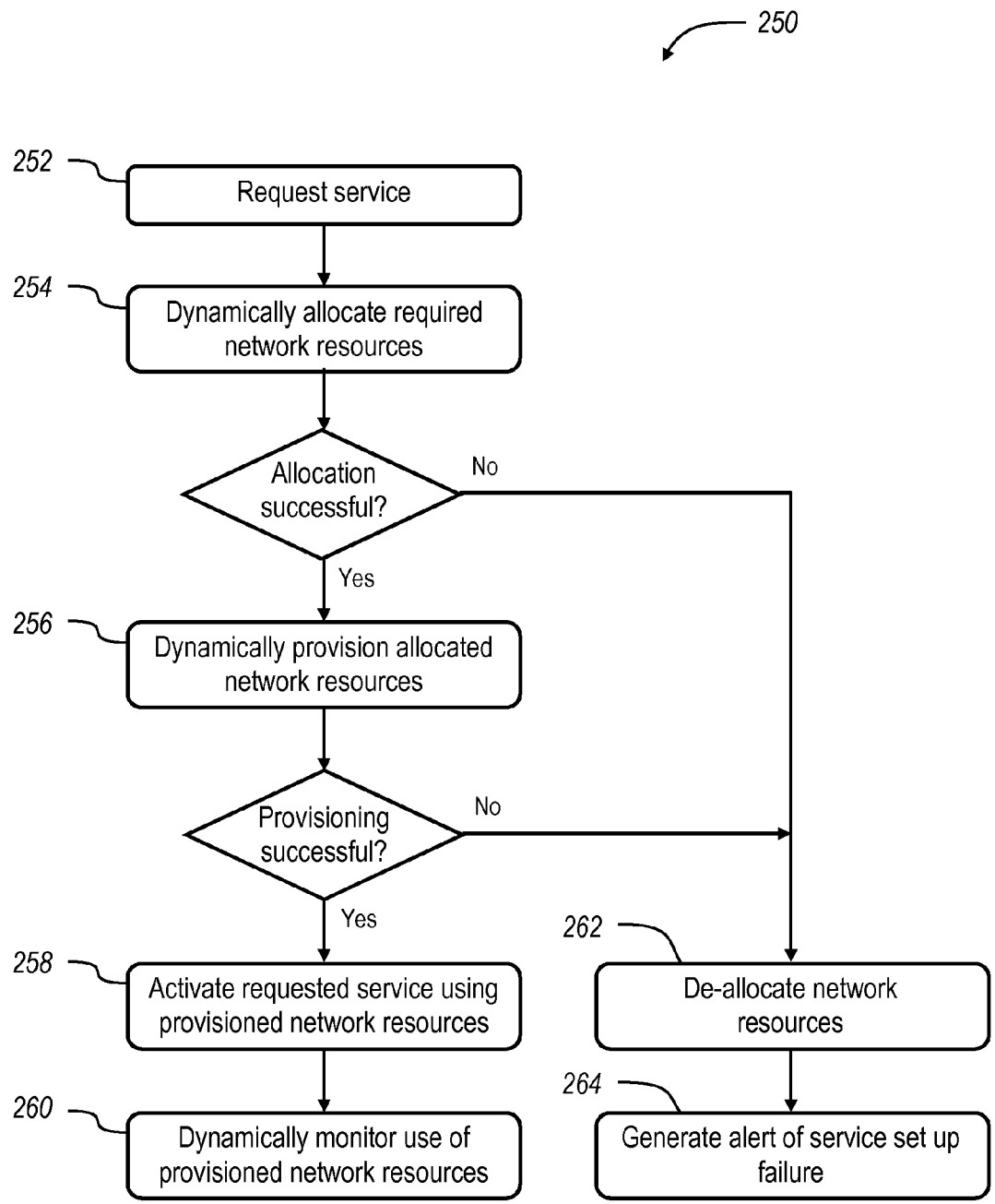
FIG. 7 illustrates a method of setting up a requested service between two users over a data network according to one embodiment.

FIG. 7 illustrates a method 250 of setting up a requested service over data network 102 according to one embodiment. The service can be provided by a service provider 110 or by a subscriber 108.

In step 252, a desired service is requested by a requesting user 106 from a providing user 106. The requesting user can be a subscriber 108 or a service provider 110. Similarly, the providing user can be a subscriber 108 or a service provider 110. In one embodiment, the desired service is selected from a list of services browsed by the requesting user.

If the service is being set up between two subscribers, e.g., the LAN party 118 shown in FIG. 2, then additional steps may be required to "request" the service. For example, to request the subscriber-to-subscriber connection, one or both of the subscribers may be required to submit, via portal 121, an identifying code associated with the other subscriber to request the connection with that subscribers. The identifying code may be published so that the subscriber can simply select the code from a list. Alternatively, the identifying code may be unpublished or blocked so that the subscriber can only obtain the code manually from the other subscriber. In one embodiment, one of the subscribers can submit the identifying code of the other subscriber, and then the other subscriber can authorize the requested connection before the "service" can be set up.

In step 254, network resources 132 required to provide the requested service are dynamically allocated. In one embodiment, the allocation is performed in a similar manner to that discussed above.

If all the required resources for the requested service are successfully allocated in step 254, then step 256 is performed. In step 256, the allocated network resources are dynamically provisioned to realize the requested service. In one embodiment, the provisioning is performed in a similar manner to that discussed above.

If all the allocated network resources are successfully provisioned in step 256, then step 258 is performed. In step 258, the requested service is activated over network 102 so that the requesting user can use the service provided by the providing user. As discussed above, while the service is activated, the providing user will act as the service provider and the requesting user will act as the subscriber, regardless of the types of user the providing and requesting user are.

In optional step 260, once the service has been activated, the service is monitored by the requesting user and/or the providing user. Monitoring can be performed to determine if errors occur in the setup of the service, to determine what level of service is actually being provided, etc. In one embodiment, monitoring can be performed via portal 121 using automated fault management and other available service support capabilities provided by the network operator.

If the allocation or provisioning of one or more of the required network resources fails in step 254 or step 256, then steps 262 and 264 are performed.

In step 262, the network resources are de-allocated. This step is only required for those network resources that have already been allocated for the requested service. In one embodiment, the de-allocation is performed using the deletion function discussed above.

In step 264, an alert is generated indicating that the service was not able to be set up. The alert can be sent to each actor affected by the failure of the setup. For example, the alert can be sent to the requesting user, the providing user, and/or the network operator via portal 121.

Similar to method 178, any or all of the steps of method 250 can be accomplished automatically, i.e., without human intervention, if desired. That is, some or all of the interactions between the requesting user, the providing user, and the network operator in setting up and using the requested service can be completely automated and programmatic to provide similar benefits as discussed above.

Once a service has been successfully set up, e.g., using one of the methods set forth above, the provisioned network resources remain tied to the service until the service has ended. Ending a service can be performed when the user no longer desires the service, such as when a subscriber cancels a service provided by a service provider. In some embodiments of the present invention, a service can be originally configured to last only a predetermined period of time, such as hours, days, weeks, or months so that the service automatically ends after the predetermined period of time has elapsed.

Regardless, once the service has ended, the network resources associated with the ended service should be freed up so they can be used for other services. This can be done by de-allocating the network resources, such as by using the deletion function, discussed above. This can sever the communication pathway used by the ended service over network 102 so as to free up the previously provisioned network resources 132. In one embodiment, de-allocation of the network resources is used to actually end the service.

Besides being used to set up services, the building blocks discussed above can also be used to automatically detect changes in the network, and to alert network actors affected by those changes. The network changes can relate to connectivity issues, planned network maintenance or any other network change.

Figure 8:
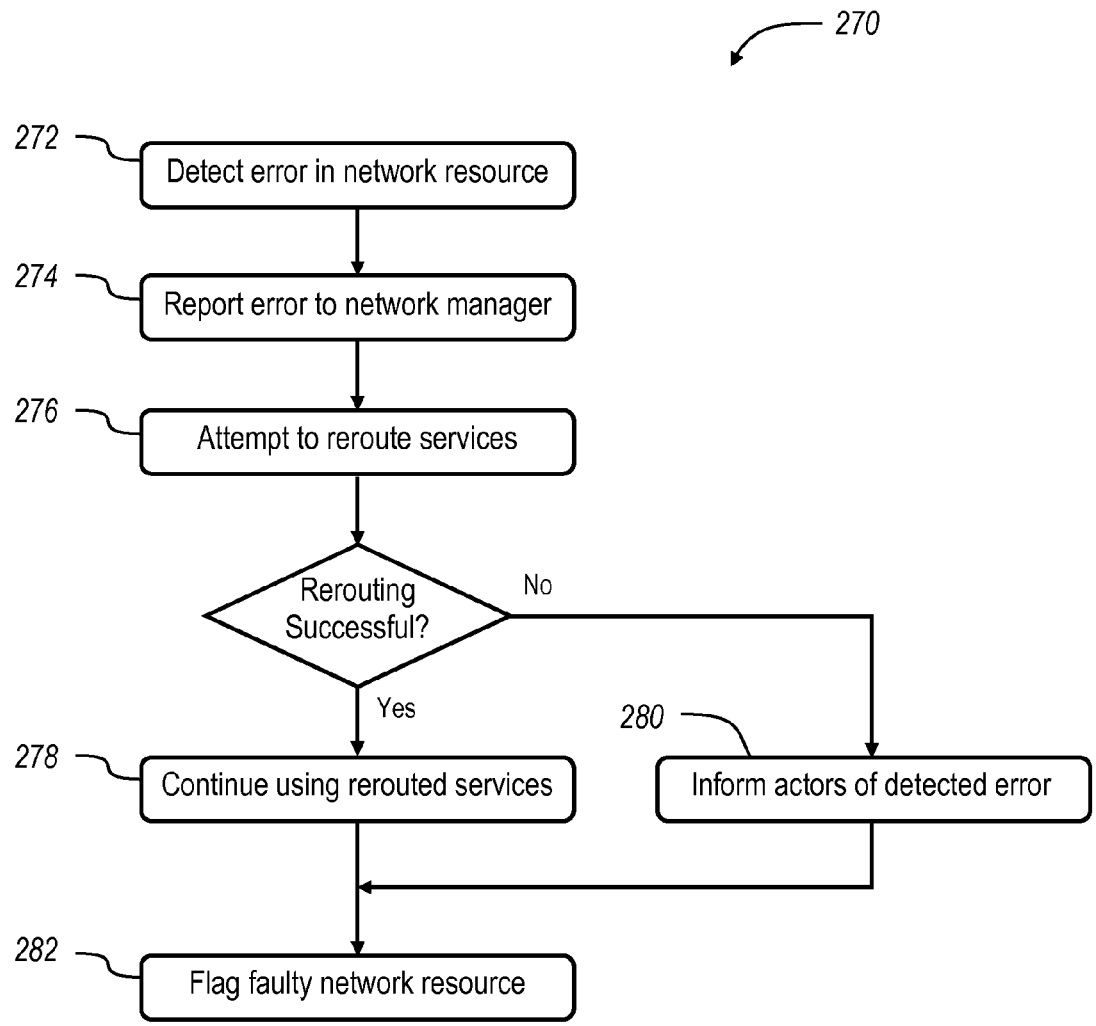
FIG. 8 illustrates a method of handling an error that occurs in a network resource of a data network according to one embodiment.

FIG. 8 illustrates a method 270 of handling an error that occurs in a network resource of network 102.

In step 272, an error is detected in a network resource. In one embodiment the error is detected by the driver associated with the particular network resource. In another embodiment, the error is detected by listener agent 129.

In step 274, the error is reported to the network manager. In one embodiment, this is accomplished using controller 128. In another embodiment, this is accomplished using listener agent 129. If abstraction stores are used, the controller or listener agent can add a corresponding fact to one of the stores, and rules can be set up to automatically detect the new fact.

In step 276, an attempt is made to reroute services around the error. In one embodiment, this includes determining services using the network resource in which the error is detected and then attempting to reroute the affected services.

If the attempt to bypass the error is successful, then step 278 is performed. In step 278, network services that have been rerouted remain in use.

Otherwise, if the attempt to bypass the error is unsuccessful in step 276, then step 280 is performed instead of step 278. In step 280, network actors associated with affected services are informed of the detected network error through portal 121 so that the network actors can take appropriate measures. The actors can include, e.g., network operator 104 and/or users 106—both subscribers 108 and/or service providers 110. In one embodiment, step 280 is performed whether rerouting was successful or not.

In step 282 the faulty network resource is flagged as being in need of repair or replacement so that new services will not attempt to use the faulty network resource. Step 282 is performed whether rerouting was successful or not.

Similar to the other methods discussed above, any or all of the steps of method 270 can be accomplished automatically, i.e., without human intervention, if desired. That is, some or all of the interactions between the faulty network resource, the network manager, the network, and the network actors can be completely automated and programmatic to provide similar benefits as discussed above.

Figure 9:
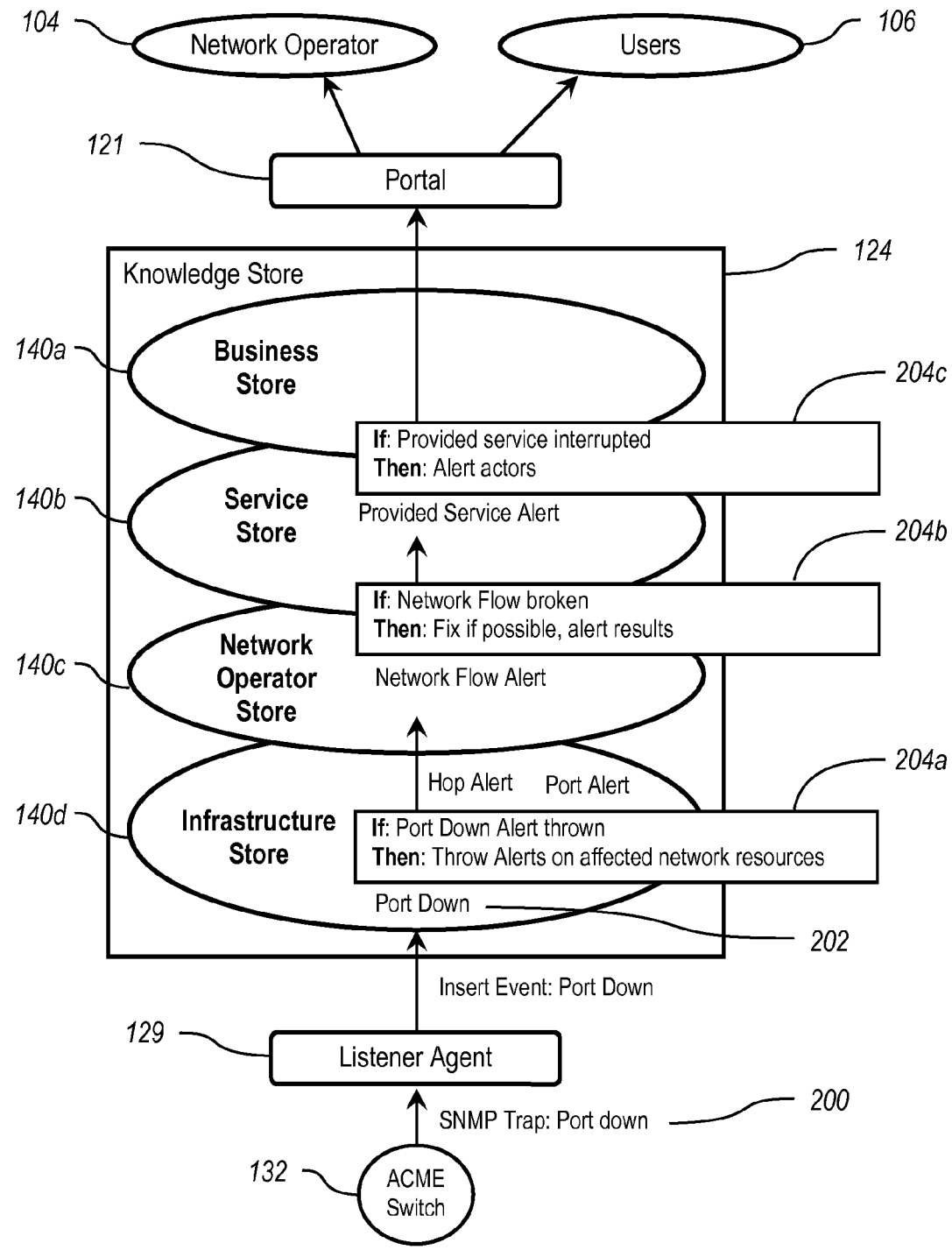
FIG. 9 illustrates a method of detecting and reporting errors using abstraction stores according to one embodiment.

In one embodiment, one or more steps of method 270 can be accomplished using abstraction stores 140 of knowledge store 124. For example, FIG. 9 depicts one embodiment in which abstraction stores 140 are used in error detection and reporting. As depicted in FIG. 9, rules 204 (204a-204c) in stores 140 can be used to automatically cause an alert to be sent to the network actors potentially affected by the detected error.

In the depicted embodiment, a Port Down error 200 is shown to have occurred on an ACME switch 132. The error can be automatically detected by listener agent 129, which can translate the error into a new fact 202 that can be added to knowledge store 124.

Rules engine 126 can use rules 204, such as rules 204a-204c, in conjunction with the information included in new fact 202 to attempt to fix the error and/or to alert the appropriate actors. For example, in one embodiment, error fact 202 can be mapped in infrastructure store 140d to the specific network port, switch, etc. corresponding to the error. Rule 204a can be used with network store 140c to automatically correlate affected network flows that correspond to the faulty network resource 132. Based on the severity of the problem, the system may try to automatically fix the problem by rerouting affected services using rule 204b. If rerouting fails or is not performed, rule 204b can be used to set up alerts to provided services that depend on the affected network flows in service store 140b. Rule 204c can then be used to automatically contact network actors associated with the affected services using business store 140a.

In a similar manner, planned network maintenance can also be reported automatically to affected network actors. However, instead of listener agent 129 detecting an error and adding a corresponding fact to infrastructure store 140d, a new fact can be added to infrastructure store 140d by network operator 104 indicating the planned network maintenance as well as applicable information, e.g., when the maintenance is scheduled to occur, how long the planned maintenance is likely to take, etc. The alert can then automatically be propagated up through abstract stores 140 in a similar manner to the error alert, discussed above. For example, if a switch or other network resource needs to be taken off-line for a brief period of time, an alert can be sent notifying all services that depend on that switch of the impending maintenance so that affected services can be re-routed before the planned maintenance. In one embodiment the alert can be sent a predetermined period of time before the change occurs.

In an exemplary embodiment, the open source production Drools rule system was used as the basis for the implementation of the FlowOps architecture, modified as required. The discussion below explains various details of how the Drools system can be used to implement FlowOps. Those skilled in the art will appreciate that this is exemplary only and that other production rule systems can also be used, such as CLIPS, discussed below.

In the exemplary embodiment, software was written in Java except for the rules which were written as a hybrid of the Drools rules language and Java. The knowledge store was initiated by FlowOps using configuration files having basic properties of the expected network-like switches and other equipment with which FlowOps was expected to communicate. Rules were loaded separately from the knowledge store and were compiled into FlowOps although they could alternatively have been loaded externally to support a more pluggable model where network operators can create, edit or load custom rules. An internal HTTP server was used to support user commands available in the API.

Drools is a Java-based production rule system that manages a working memory of facts and rules that fire based on existing (or non-existing) facts and corresponding properties. The Java host initializes Drools by loading rules and creating a stateful knowledge session which allows facts to persist while running rules.

A few code samples are now given to illustrate how FlowOps can use Drools. The first sample, shown in Table 1, below, includes pseudo code that can be used to initiate a port.

TABLE 1

```
1  rule "Enable a port"
2  when
3     enableCmd : EnablePort( )
4     port : Port(id == enableCmd.portId, !enabled)
5  then
6     port.enable( );
7     update(port);
8     retract(enableCmd);
9  end
```

As shown in Table 1, the first sample includes a when/then construct. In this construct, the lines of code associated with the "then" section (lines 6-8) are only run when the "when" section (lines 3-4) become true. As such, the "when" section (i.e., lines 3-4) is analogous to the WHERE statement in an SQL query. When the "then" section of the first sample is run, the port is enabled, the Drools engine is notified that the port object has changed, and the EnablePort command is removed.

The first sample is fairly straightforward with respect to the when/then construct. Rules may also be more complex, with some having large "when" sections that can test groups of facts with certain properties and nested conditions. If multiple rules are triggered at the same time, Drools can consult a "salience" value assigned to each rule to determine the order in which the rules should be run, and the outcome of the earlier rules may change facts in such a way that the lower-salience rules no longer need to execute. Rules can be set up to "chain"; that is, when a rule runs, its side effects can include addition, deletion, or updates to other facts, which can, in turn, cause other rules to fire. For example, consider the rule shown in the second sample, show in Table 2, below.

TABLE 2

```
1  rule "Check carrier on port"
2  when
3     port : Port(enabled)
4     not(CarrierCheck(portId == port.id))
5  then
6     insert(port.carriercheck( ));
7  end
```

The rule set forth in Table 2 provides a way to check for a carrier on a port once the port has been enabled. The rule fires only if information about a carrier on the port is not already available. The carriercheck( ) function can, in turn, cause other rules to be fired if a carrier is not detected. For example, rules can be set up to run additional diagnostics on the port or to alter appropriate parties. Other rules can also be set up to invalidate the CarrierCheck( ) object, which can cause the carriercheck( ) function to be run again.

Information can flow into and out of Drools in several ways. For example, rules can insert, update, and remove facts, as seen in the examples above. Alternatively, facts can be inserted through an API, such as API 160, discussed above, that can allow service providers to describe the networks they wish to build to reach their customers. Still further, facts about the state of the network can be inserted by personnel at the network operator. Finally, agents can collect dynamic information about devices in the network using technologies such as SNMP and NetFlow. Within Drools, these sources of information are distinguished as different "entry points," which can be referenced in the 'when' sections of rules. This can allow FlowOps to behave differently when, for example, a port goes offline because an administrator explicitly disabled it (an intentional action) as opposed to being reported by the switch itself (indicating a possible failure in the network.)

In the exemplary embodiment, Floodlight was used as the controller 128 for the system. Floodlight is an open source OpenFlow controller, written in Java and maintained by Project Floodlight, which allows static flows to be installed on OpenFlow-enabled switches through a RESTful API. Commands from the network manager to install or remove configurations can be translated into RESTful calls and sent to Floodlight. Floodlight can be started separately from FlowOps and Floodlight can be set up so that the only interaction between Floodlight and FlowOps can be through a static flow pusher API. By using the static flow pusher, network configurations can be used that do not require any learning based on network addresses. This can result in a hub-like network where packets can be sent to all possible destination paths.

A number of basic network abstractions were chosen as example services to demonstrate the utility of FlowOps in the exemplary embodiment. For example, VLANs, the most common sliceable method available in switches, were chosen as the backbone for services. Supported provided services in the example included LANs and VLANs. Provided LANs were mapped to backbone VLANs where the edge points remove the VLAN before exiting the network. Provided VLANs can be mapped directly to backbone VLANs and can allow a user to define whether a tag should exit at any end point or not. Some supported topologies for both LANs and VLANs can include E-LINE (point-to-point), E-TREE (root-to-leaf), and E-LAN (many-to-many).

In the exemplary embodiment, API 160 was developed to include many common interface calls to access various portions of knowledge store 124 and rules library 125 and to perform various tasks. For example, API 160 was designed to allow for unauthorized calls to view general information in knowledge store 124. In one embodiment, the calls required a token to be set, for example in an HTTP header, which designated the particular user making the call. This can provide access to user views and accountability when dealing with network resources. In one embodiment, available API calls to work with network resources can include one or more of the following:

allocate, which requests that a network resource be allocated and returns the ID of the particular resource allocated. This function may require a resource specification document (RSPEC).

provision, which requests that a particular network resource be provisioned. The particular ID of the resource may be required. The ID may be obtained when the resource is allocated.

delete, which requests that a network resource be released or de-allocated. The particular ID of the resource may be required. The ID may be obtained when the resource is allocated.

update, which requests that a network resource be updated with current information.

In one embodiment, available API calls to query for state information can include one or more of the following:

all to request information regarding all facts,
provided to request information regarding provided services,
backbone to request information regarding services in network operator layer 140*c*,
slivers to request information regarding all configured network resources,
hostedon to request information regarding the services configured through a particular infrastructure device. The ID of the particular device may be required,
connectables to request information regarding connectivity points, actors, and alerts.

The above API calls are exemplary only; it is to be understood that other calls and functions are also possible.

Many features available in the Drools rules engine can be used to implement the model more efficiently. For example, salience values, as discussed above, can be used to consolidate rules, which can help to prevent the use of rules that may be substantial duplicates of each other. That is, one rule can be written which is the default behavior at any layer of the model, while rules for specific conditions that require modified behavior from this default can be created with higher salience values. Channels and entry points can also be used as a means to enter information into and extract information from knowledge store 124.

Figure 10:
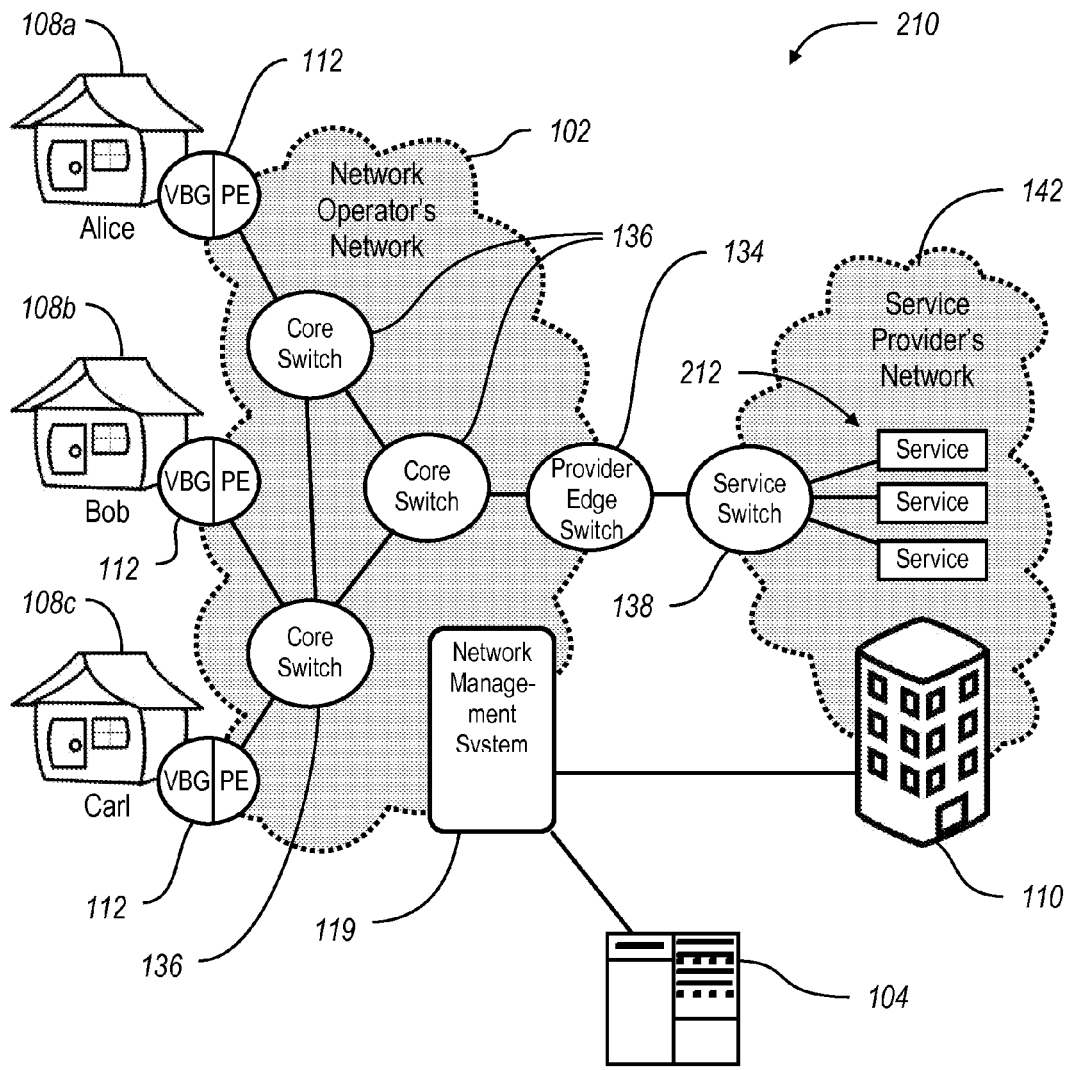
FIG. 10 depicts an exemplary system that was used to test embodiments of the present invention.
Figure 11:
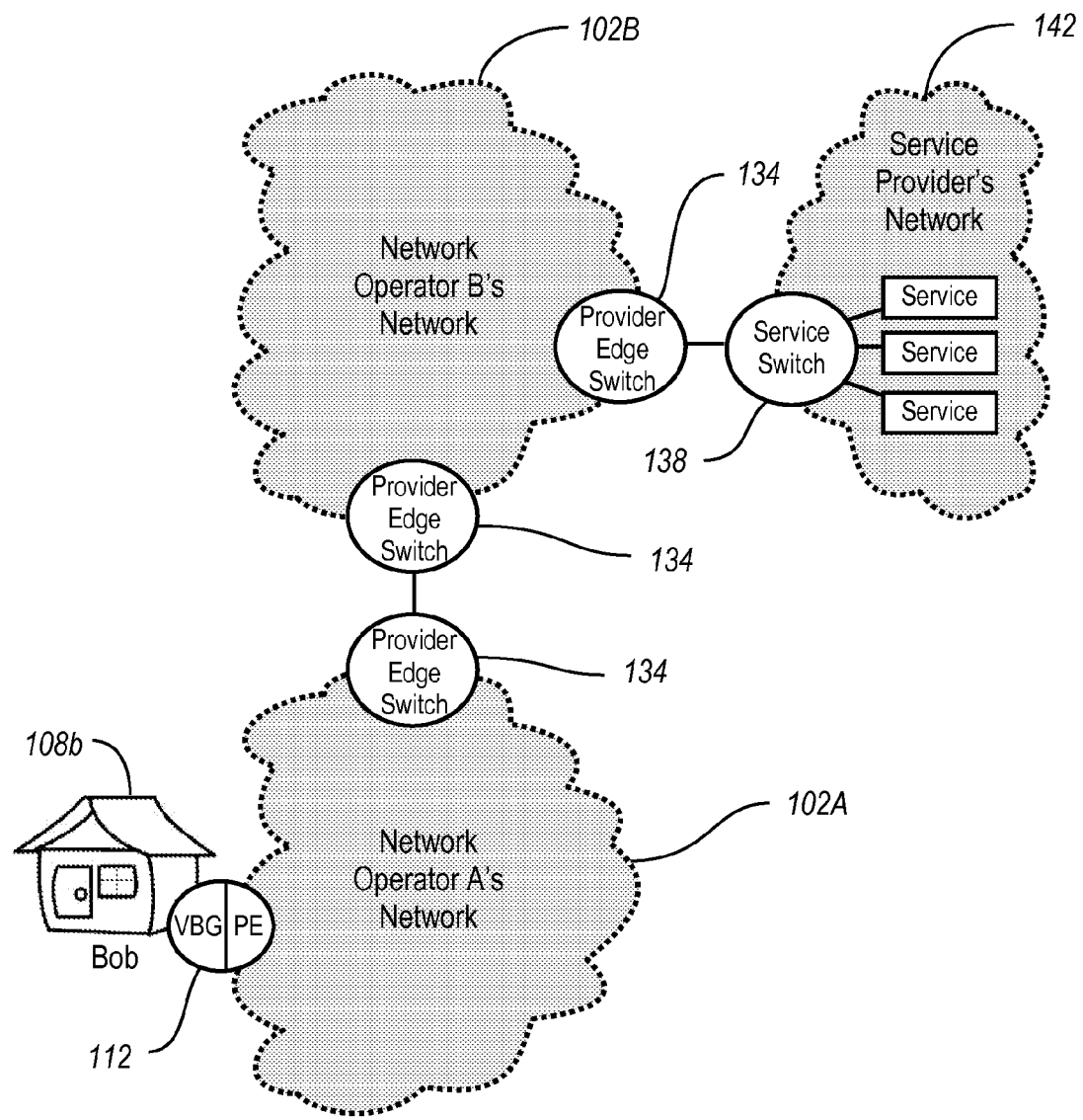
FIG. 11 depicts an alternative system having multiple operator networks.

FIG. 10 depicts an exemplary system 210 that was used to test the exemplary FlowOps embodiment, discussed above. System 210 includes data network 102 managed and controlled by network management system 119. The network actors in system 210 include network operator 104, service provider 110, and three subscribers 108 (Alice 108*a*, Bob 108*b*, and Carl 108*c*). The exemplary network infrastructure includes switches enabling connectivity through edge points where subscribers 108 and service providers 110 connect into the network. For example, provider edge switch 134, such as a large commercial switch in a data center, is used to connect service provider 110 to network 102 and VBG/PEs 112 are used on the houses of each subscriber 108 to allow a virtualized network to be set up within the subscriber's premises. The exemplary network infrastructure further includes core switches 136 connecting the edge points together. For simplicity, any reference to the network operator's network will simply be referred to as network 102.

In the depicted system 210, service provider 110 has its own network 142 with a service switch 138. The service provider's network 142 is connected to network 102 via a connection between service switch 138 and a port on provider edge switch 134. Within the service provider's network 142 are hosts which can offer services 212 to subscribers 108 through network 102 when the appropriate network resources are correctly partitioned, as discussed above. The three subscribers Alice 108*a*, Bob 108*b*, and Carl 108*c* are each connected to one of the VBG/PEs 112 on the edge of network 102. VBG/PEs 112 can have a fixed connection into network 102 and can have multiple open end points to which the subscriber can connect to receive and configure services.

An initial evaluation was performed by running FlowOps on a host machine while connected to an emulated network environment inside a virtual machine using Mininet, an open source virtual network supported by the Mininet Support Group. The emulated network environment was designed to emulate the network environment of system 210. Mininet supports creating virtual instances of OpenFlow-enabled switches and connecting them together to simulate a real network environment. In the emulated environment each network switch was a separate instance of Open vSwitch, an open source virtual switch that supports the OpenFlow protocol. The emulated switches were controlled via the Floodlight OpenFlow controller, which in turn was driven by FlowOps.

Using the emulated network environment, FlowOps was able to successfully configure many services. Some notable ones include:

Services between subscribers. An Ethernet E-LAN between subscribers Alice 108a, Bob 108b, and Carl 108c was successfully set up using abstraction stores 140, as discussed above. The service was set up so that it did not require the use of service provider 110. None of the users 108 needed special equipment that understands VLANs. Using this type of service, a LAN party, for example, could be set up between subscribers 108a, 108b, and 108c.

Services between a service provider and a subscriber. A VLAN E-LINE between service provider 110 and subscriber Bob 108b was successfully set up using abstraction stores 140, as discussed above. Because service provider 110 had access on only one port into network 102, VLANs were required to differentiate services as service provider 110 sent packets. Bob's end point was successfully configured to remove the VLAN so that his equipment had no need to understand VLANs. Service provider 110 can use this approach to provide Internet, VoIP, etc. to individual subscribers 108.

Broadcast services between a service provider and multiple subscribers. A VLAN E-TREE from service provider 110 (acting as the root) to all of the subscribers Alice 108a, Bob 108b, and Carl 108c (acting as leaves) was successfully set up using abstraction stores 140, as discussed above. Similar to the VLAN E-LINE, a VLAN was required for service provider 110 to specify which packets belonged to which service. The tag was successfully removed before the packets reached the subscriber equipment.

The above examples and successful emulations of services that can be set up using FlowOps demonstrate real-world applications of many of the value-added features available through FlowOps. In particular, they demonstrate the dynamic and automatic manner in which FlowOps can set up and manage service resources in a network.

Using the emulated network environment, a bottom-to-top test was also run to determine if the high-level entities were able to deal with low-level problems, such as network ports going down, using FlowOps. For simplicity, a simulated driver was created to simulate port up/down events. The simulated events would then get added into knowledge store 124 and processed in the manner discussed above. The following scenarios were tested and FlowOps successfully handled all of them:

Port down in a path which can be rerouted. The port was taken down, which caused the fact to automatically be stored in knowledge store 124. The alert propagated from the port up to the backbone VLAN using abstraction stores 140, as discussed above. At that point an alternative network route was determined and successfully configured and an alert propagated up informing affected services, depending on the backbone VLAN, that the problem had been detected and a new route had been installed.

Port down in a path where no other possible path exists. The port was taken down, which caused the fact to automatically be stored in knowledge store 124. The alert propagated from the port up to the backbone VLAN using abstraction stores 140, as discussed above. Since no other network route existed, the port down event propagated all the way up abstraction stores 140, as discussed above, such that users 106, 108 and network operator 104 were alerted that the problem had been detected.

The above examples and successful handling of system resource errors by FlowOps demonstrate real-world applications of many of the value-added features available through FlowOps. In particular, they demonstrate the dynamic and automatic manner in which FlowOps can detect network resource problems, attempt to fix those problems, and notify respective parties of affected services accordingly.

Figure 12:
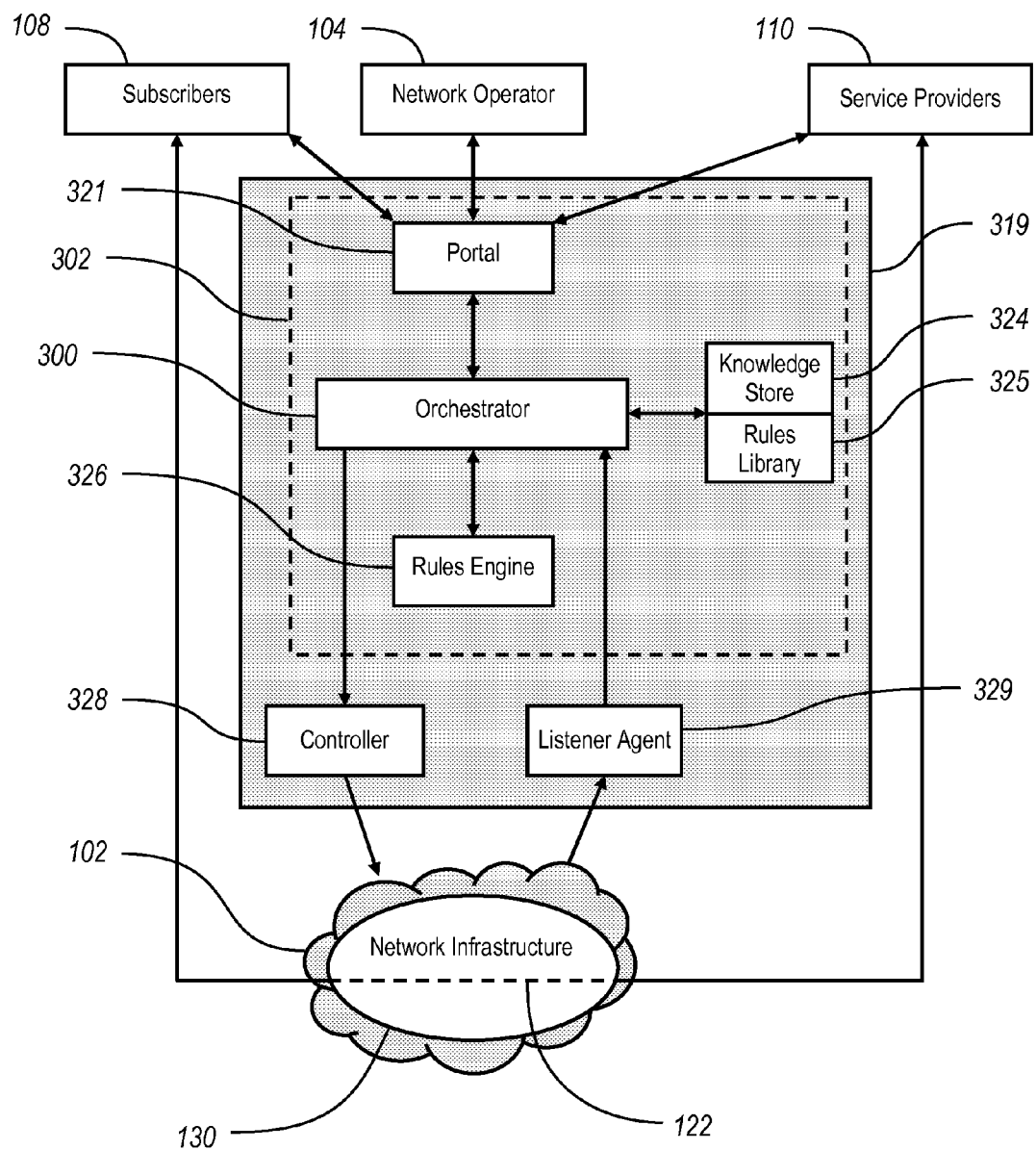
FIG. 12 is a block diagram of a system that incorporates a network management system according to another embodiment.

FIG. 12 is a block diagram illustrating a network management system 319 according to a second embodiment. Similar to network management system 119 (FIG. 3), network management system 319 is used to automatically and dynamically manage and control connection pathways 122 between subscribers 108 and service providers 110 through network infrastructure 130 of data network 102. In a general sense, network management system 319 can be seen as a different way of viewing network management system 119.

Similar to network management system 119, network management system 319 includes a portal 321 for the network actors (network operator 104, subscribers 108, and service providers 110) to access the system and a controller 328 and listener agent 329 to respectively control and provide feedback from network 102. Network management system 319 also includes a rules engine 326, a knowledge store 324, and a rules library 325, to aid in making automated decisions with respect to the network in a similar manner to that discussed above.

Unlike network management system 119, network management system 319 includes a network resources coordinator 302. Network resources coordinator 302 manages and coordinates the use of network resources by requested services and includes many of the portions of network management system 319 discussed above. For example, as shown in the depicted embodiment, network resources coordinator 302 comprises portal 321, rules engine 326, knowledge store 324, and rules library 325.

Network resources coordinator 302 also includes an orchestrator 300 that coordinates everything. Orchestrator 300 receives service inputs (e.g., service requests or cancellations) through portal 321 from network operator 104, subscribers 108, and service providers 110. Orchestrator 300 uses the rules engine 326 in conjunction with knowledge store 324 and rules library 325 to determine network resources required and available for requested services and to dynamically make automated decisions with respect to the network, e.g., in the manner discussed above. Orchestrator 300 facilitates the automatic setting up and configuring of network resources via controller 328, and is apprised of network resource information via listener agent 329, e.g., in a similar manner to that discussed above.

As discussed above, FlowOps can provide structured, automated network management for heterogeneous data network environments. FlowOps can be used to implement all or a portion of network resources coordinator 302. As such, FlowOps can be used to implement portal 321, orchestrator 300, rules engine 326, knowledge store 324, and/or rules library 325. As a result, the network resources coordinator 302 can employ the same layered abstraction approach discussed above to coordinate and manage network 102. Furthermore, all of the methods discussed herein can be used with network management system 319 in addition to network management system 119.

Figure 13:
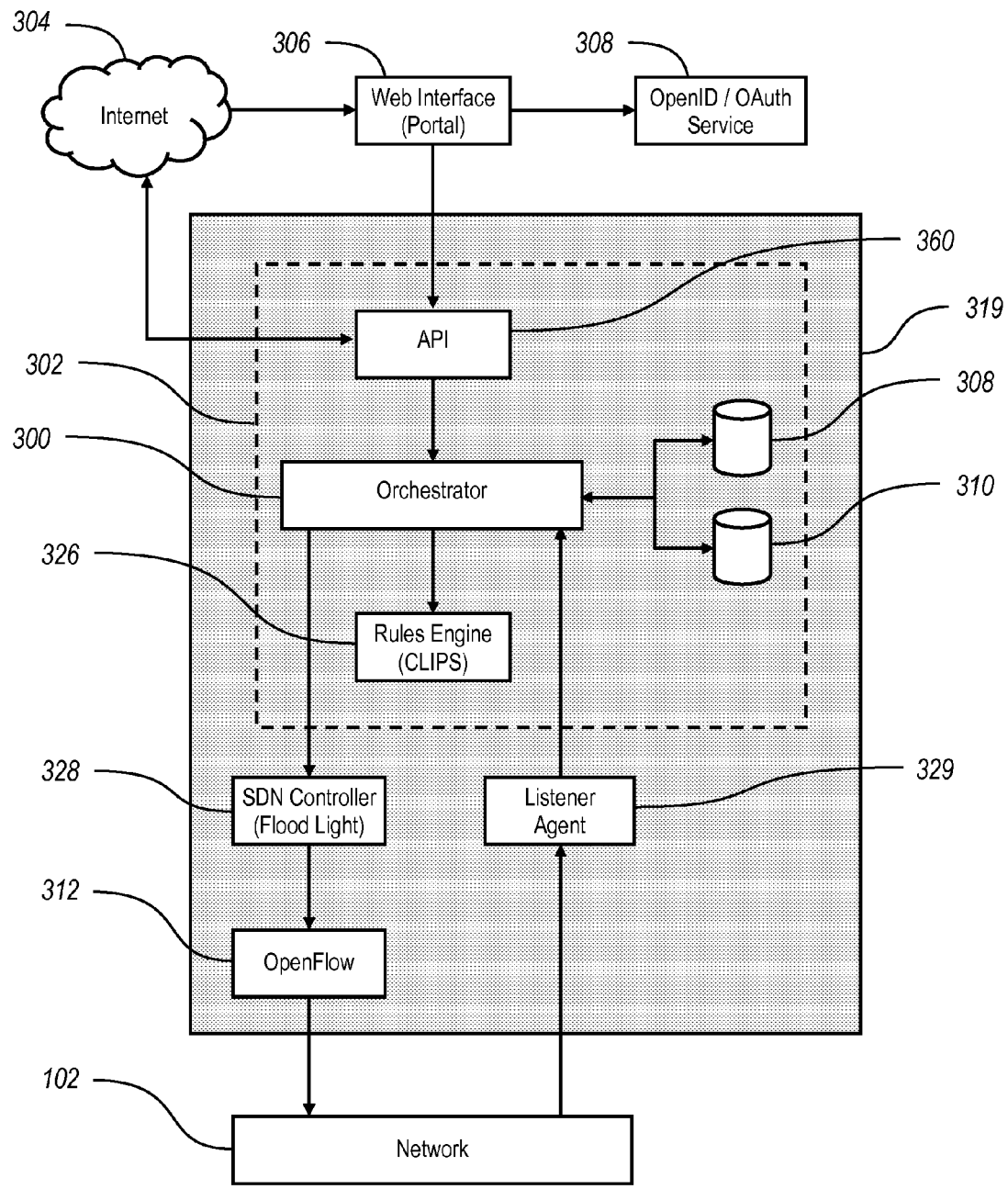
FIG. 13 is a block diagram illustrating an exemplary embodiment based on the network management system shown in FIG. 12.

FIG. 13 illustrates an exemplary embodiment based on network management system 319 shown in FIG. 12. As shown in FIG. 13, an API 360 is used as the portal 321 into the network management system 319. API 360 can be similar to API 160 discussed above. API 360 is set up to receive network actor inputs from the internet 304 directly or through a web interface portal 306. Web interface portal 306 can use an Open ID/OAuth Service 308 to provide added security for system access by network actors.

In the exemplary embodiment, the knowledge store and rules library are stored, along with other information used by network resources coordinator 302, in a FlowOps database 308 and a reporting database 310. FlowOps database 308 is used to store information used by FlowOps, including, e.g., configuration information, rules information, and authentication information. Reporting database 310 is used to store historical data that can be used, e.g., for determining usage over time for individual users, historical trends, diagnostics, etc. The data can also include business intelligence information and business analytics information, if desired.

In the exemplary embodiment, Open Daylight is used as controller 328. Similar to Floodlight, discussed above, Open Daylight is an open source OpenFlow controller that allows static flows to be installed on OpenFlow-enabled switches through a RESTful API. Open Daylight can be used in a manner similar to Floodlight, discussed above. For example, commands from orchestrator 300 to install or remove network configurations can be translated into RESTful calls and sent to Open Daylight. Open Daylight can be started separately from FlowOps and can be set up so that the only interaction between Open Daylight and FlowOps is through a static flow pusher API. OpenFlow 312 can be used to enable or disable network resources in network 102, as discussed above, under the direction of Open Daylight.

In the exemplary embodiment, open source production CLIPS rule system is used as rules engine 326, modified as required. Similar to the Drools rule system discussed above, CLIPS is a production rule system that manages a working memory of facts and rules that fire based on existing (or non-existing) facts and corresponding properties. The CLIPS rule system can be implemented in generally the same manner as the Drools system discussed above.

In the exemplary embodiment, orchestrator 300 receives network service requests from API 360, processes and executes the service requests using the CLIPS rules engine 326 in conjunction with the knowledge store and rules library stored in FlowOps database 308, and sends commands to Flood Light 328, as needed, to configure network resources accordingly. Orchestrator 300 also receives inputs from listener agent 329 to determine which network resources are available and which network resources are being used and for what.

The exemplary embodiment shown in FIG. 13 was set up, with FlowOps being used to implement all of the portions of network resources coordinator 302. Software was written in PHP except for the rules which were written as a hybrid of the CLIPS rules language and PHP, and data from a relational database. The knowledge store was initiated by FlowOps using configuration files having basic properties of the expected network-like switches and other network equipment with which FlowOps was expected to communicate. Rules were loaded separately from the knowledge store and were compiled into FlowOps although they could alternatively have been loaded externally to support a more pluggable model where network operators can create, edit or load custom rules. FlowOps initialized CLIPS by loading rules and creating a stateful knowledge session which allows facts to persist while running rules. An internal HTTP server was used to support user commands available in the API.

The same types of code and commands used with Drools, above, were also generally set up and used with CLIPS and orchestrator 300. For example, in the exemplary embodiment, API 360 was developed to include many common interface calls, sent to orchestrator 300 to access various portions of the knowledge store and rules library and to perform various tasks. For example, API 360 and orchestrator 300 were designed to allow unauthorized calls to view general information stored in the knowledge store. In one embodiment, the calls required a token to be set, for example in an HTTP header, which designated the particular user making the call. This can provide access to user views and accountability when dealing with network resources.

In one embodiment, available API calls to work with network resources can include one or more of: allocate, provision, delete, and update, as discussed above. In one embodiment, available API calls to query for state information can include one or more of: all, provided, backbone, slivers, hostedon, and connectables, as discussed above. The above API calls are exemplary only; it is to be understood that other calls and functions are also possible.

Exemplary system 210 shown in FIG. 10 was again used to test the FlowOps system, this time using network management system 319 instead of network management system 119. Similar to the testing of network management system 119, an initial evaluation was performed by running FlowOps on a host machine while connected to an emulated network environment designed to emulate the network environment of system 210 inside a virtual machine using Mininet.

Using the emulated network environment, FlowOps was again able to successfully configure many network services, including (i) services between subscribers, (ii) services between a service provider and a subscriber, and (iii) broadcast services between a service provider and multiple subscribers, in the same manner as discussed above. Furthermore, FlowOps was again able to handle simulated low-level network problems, including (i) a port down in a network path which can be rerouted and (ii) a port down in a network path where no other possible path exists, in the same manner as discussed above.

This again demonstrates real-world applications of many of the value-added features available through FlowOps, including the dynamic and automatic manner in which FlowOps (i) can set up and manage network service resources and (ii) can detect network resource problems, attempt to fix those problems, and notify respective parties of affected services accordingly.

Using FlowOps with the exemplary network environments discussed above has demonstrated that FlowOps supports the creation of usable data networks using the architectures described herein. In particular, it has demonstrated that FlowOps can operate a data network, such as an open access network, in a dynamic, automated manner, based on external users asking for slices of the network resulting in reasoning in the various abstraction layers. It has also demonstrated that FlowOps can detect errors in the network and, if possible, automatically reroute services around the detected errors or, if not possible, alert users to the detected errors.

Although the above discussion has focused on the benefits of using FlowOps with open access networks, FlowOps can also provide great benefits when used with other types of networks. For example, FlowOps can provide many benefits when used in a local area network (LAN) or a cloud computing environment.

As discussed above, FlowOps can support SDN based network devices and can use OpenFlow device drivers with those devices. SDN is an approach to networking in which control is decoupled from hardware and given to a software application. The goal of SDN is to allow network engineers and administrators to respond quickly to changing business requirements.

When a packet arrives at a switch in a conventional network, rules built into the switch's proprietary firmware tell the switch where to forward the packet. The switch sends every packet going to the same destination along the same path—and treats all the packets the exact same way. In the enterprise, smart switches designed with application-specific integrated circuits (ASICs) are sophisticated enough to recognize different types of packets and treat them differently, but such switches can be quite expensive.

In a software-defined network, a network administrator can shape network traffic from a centralized control console without having to touch individual switches. The administrator can change any network switch's rules when necessary—prioritizing, de-prioritizing or even blocking specific types of packets with a very granular level of control. This can be quite helpful in a cloud computing architecture because it allows the administrator to manage network traffic loads in a flexible and more efficient manner. Essentially, this allows the administrator to use less expensive commodity switches and have more control over network traffic flow than ever before.

In addition, when an SDN LAN is combined with FlowOps, not only can the individual network switches be controlled from a centralized console, but the services and users can also be managed and controlled from the same centralized console. As such, the network administrator can more efficiently manage the LAN resulting in a more cost effective system.

In addition, when used with a virtualized network, FlowOps can manage and control service resources not only to the end points of the network, but to the end point of the service. As such, FlowOps can manage and control service resources to the service user's computer(s), resulting in better management of services and more accurate troubleshooting. Furthermore, end to end service can be provided so that no setup is required to be performed by the user within the user's premises, something that is typically required of the user when a conventional NID is used.

FlowOps is unique in applying a rule-based approach to both "read and write" network management tasks (i.e., network configuration and fault management) in a single framework, as well as doing so automatically (i.e., without human interaction being required). FlowOps is not just an abstract concept to improve network management and operation but has been implemented and demonstrated to work. Having knowledge at all abstraction layers in the model allows the network manager or orchestrator to reason about and create a value-added experience through integration of abstract, high-level definitions all the way down to bare-metal and back up.

Network management is an extremely complex task and involves dealing with a vast array of issues and mixed environments. To achieve separation of network transport from service, core management elements can be designed using embodiments of the present invention to dynamically coordinate and execute essential network functions, such as, e.g., the ability to:

reliably and accurately maintain a network map or inventory of network devices,
identify and respond to changes in network states,
model dependencies and relationships of the network,
accurately store and update "facts" about the network,
propagate relevant information throughout the system as needed,
accurately and dynamically translate messages from the knowledge store to network devices via a controller,
provide extensibility to network operators, subscribers, and service providers via a portal and API's, and
remain agnostic to specific network devices.

The FlowOps implementation illustrates automated "closed loop" network management functions by dealing with configuration and fault management tasks in an integrated framework. Using FlowOps, innovative services can be easily and quickly set up and run on top of the programmable network environment so that service providers and subscribers have incentives to migrate to a network operator providing such an environment. Furthermore, FlowOps can allow open access and other types of networks to support services and applications that can truly exploit the capabilities of low latency and high capacity access networks and become the enablers for innovation they were originally envisioned to be.

The present invention may be embodied in other specific forms without departing from its spirit or essential characteristics. Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented by a network resources coordinator, for automating the implementation of services that are provided by third-party service providers over a dynamic open access network, the method comprising:

maintaining a knowledge store which defines network resources of the dynamic open access network including how the network resources are interconnected, the network resources comprising switches, the knowledge store further defining a number of third-party services that have been provisioned on the dynamic open access network;

receiving, from a subscriber, a request for a third-party service that is available to be provided over the dynamic open access network by a first service provider;

identifying one or more endpoints of the subscriber within the dynamic open access network where the requested third-party service will be provided and one or more endpoints of the first service provider within the dynamic open access network where the requested third-party service will originate;

accessing the knowledge store using the one or more endpoints of the subscriber and the one or more endpoints of the first service provider to identify one or more paths across the network resources that interconnect the one or more endpoints of the subscriber and the one or more endpoints of the first service provider, each of the one or more paths encompassing one or more of the switches;

based on the requested third-party service and for each of the one or more paths, accessing the knowledge store to identify whether the one or more switches of the corresponding path can be provisioned to implement the requested third-party service including identifying whether any of the one or more switches has already been provisioned to implement one or more of the number of third-party services and, if so, whether the one or more switches have capacity to provision the requested third-party service;

upon identifying that a first path of the one or more paths can be provisioned to implement the requested third-party service, configuring the one or more switches of the first path to provision the requested third-party service; and updating the knowledge store to define that the requested third-party service has been provisioned over the first path.

2. The method of claim 1, wherein the knowledge store comprises a plurality of abstraction stores.

3. The method of claim 2, wherein the plurality of abstraction stores includes an infrastructure store which defines the network resources of the dynamic open access network and how the network resources are interconnected.

4. The method of claim 3, wherein accessing the knowledge store using the one or more endpoints of the subscriber and the one or more endpoints of the first service provider to identify one or more paths across the network resources that interconnect the one or more endpoints of the subscriber and the one or more endpoints of the first service provider comprises accessing the infrastructure store.

5. The method of claim 3, wherein the network resources also include one or more of gateways, routers, or NIDs and the first path includes at least one of a gateway, a router, or a NID.

6. The method of claim 3, wherein the plurality of abstraction stores includes a network operator store which defines paths over which the number of third-party services have been provisioned on the dynamic open access network.

7. The method of claim 6, wherein the plurality of abstraction stores includes a service store which defines, for each third-party service that is available to be provided over the dynamic open access network, which network resources are required to provide the third-party service.

8. The method of claim 7, wherein the plurality of abstraction stores includes a business store which includes subscriber-viewable information about each third-party service, and wherein the request is received from the subscriber in response to the subscriber accessing the business store via a portal to view each of the third-party services that is available to be provided over the dynamic open access network.

9. The method of claim 1, wherein the one or more switches are configured by a controller that automatically detects changes in the knowledge store, and the knowledge store is updated by a listener agent that automatically detects changes in the configuration of the network resources.

10. The method of claim 1, wherein the knowledge store is updated by a rules engine in accordance with rules defined in a rules library.

11. The method of claim 1, wherein the knowledge store comprises a business store, a service store, a network operator store, and an infrastructure store, and wherein the method comprises, in response to receiving the request, adding a service fact to the service store, the service fact identifying the subscriber, the first service provider, and the requested third-party service.

12. The method of claim 11, wherein accessing the knowledge store using the one or more endpoints of the subscriber and the one or more endpoints of the first service provider to identify one or more paths comprises, in response to identifying the service fact in the service store, accessing the network operator store to identify the one or more paths.

13. The method of claim 12, wherein accessing the knowledge store to identify whether the one or more switches of the corresponding path can be provisioned to implement the requested third-party service comprises accessing the infrastructure store.

14. The method of claim 13, further comprising:
prior to configuring the one or more switches of the first path to provision the requested third-party service, allocating the one or more switches to the requested third-party service.

15. The method of claim 13, wherein the one or more switches are configured based on one or more rules defined in a rules library.

16. The method of claim 1, further comprising:
detecting a change in status of one or more of the network resources; and
updating the knowledge store to reflect the changed status of the one or more network resources.

17. The method of claim 1, further comprising:
detecting that one or more network resources of the first path are no longer available;
accessing the knowledge store to identify an alternate path that can be provisioned to implement the requested third party-service; and
configuring each network resource in the alternate path to provision the requested third-party service over the alternate path.

18. The method of claim 1, wherein the requested third-party service requires a specified amount of bandwidth, and wherein identifying whether the one or more switches have capacity to provision the requested third-party service comprises identifying whether the one or more switches can provide the specified amount of bandwidth.

19. A network resources coordinator for automating the implementation of services that are provided by third-party service providers over a dynamic open access network, the network resources coordinator configured to perform a method comprising:
maintaining a knowledge store which defines network resources of the dynamic open access network including how the network resources are interconnected, the network resources comprising switches, the knowledge store further defining a number of third-party services that have been provisioned on the dynamic open access network;
receiving, from a subscriber, a request for a third-party service that is available to be provided over the dynamic open access network by a first service provider;
identifying one or more endpoints of the subscriber within the dynamic open access network where the requested third-party service will be provided and one or more endpoints of the first service provider within the dynamic open access network where the requested third-party service will originate;
accessing the knowledge store using the one or more endpoints of the subscriber and the one or more endpoints of the first service provider to identify one or more paths across the network resources that interconnect the one or more endpoints of the subscriber and the one or more endpoints of the first service provider, each of the one or more paths encompassing one or more of the switches;

based on the requested third-party service and for each of the one or more paths, accessing the knowledge store to identify whether the one or more switches of the corresponding path can be provisioned to implement the requested third-party service including identifying whether any of the one or more switches has already been provisioned to implement one or more of the number of third-party services and, if so, whether the one or more switches have capacity to provision the requested third-party service;

upon identifying that a first path of the one or more paths can be provisioned to implement the requested third-party service, configuring the one or more switches of the first path to provision the requested third-party service; and updating the knowledge store to define that the requested third-party service has been provisioned over the first path.

20. The network resources coordinator of claim 19, wherein the knowledge store comprises a plurality of abstraction stores including a business store which includes subscriber-viewable information about each third-party service, a service store which defines, for each third-party service that is available to be provided over the dynamic open access network, which network resources are required to provide the third-party service, a network operator store which defines paths over which the number of third-party services have been or can be provisioned on the dynamic open access network, and an infrastructure store which defines the network resources of the dynamic open access network and how the network resources are interconnected.

* * * * *